(12) United States Patent
Ono et al.

(10) Patent No.: US 6,499,579 B2
(45) Date of Patent: Dec. 31, 2002

(54) WET TYPE FRICTION MEMBER

(75) Inventors: Hideo Ono, Nishikamo-gun (JP); Yukiharu Honda, Okazaki (JP)

(73) Assignee: Aisin Kako Kabushiki Kaisha, Nishikamo-gun (JP)

(*) Notice: Subject to any disclaimer, the term of this patent is extended or adjusted under 35 U.S.C. 154(b) by 13 days.

(21) Appl. No.: 09/824,761

(22) Filed: Apr. 4, 2001

(65) Prior Publication Data

US 2001/0042668 A1 Nov. 22, 2001

(30) Foreign Application Priority Data

Apr. 13, 2000 (JP) ........................... 2000-112610

(51) Int. Cl.[7] ............................................ F16D 25/064
(52) U.S. Cl. ............................. 192/113.36; 192/70.12
(58) Field of Search ....................... 192/113.36, 113.22, 192/70.12; 188/264 D, 264 E

(56) References Cited

U.S. PATENT DOCUMENTS

| | | | | |
|---|---|---|---|---|
| 2,690,248 A | * | 9/1954 | McDowall | 192/113.36 |
| 5,094,331 A | * | 3/1992 | Fujimoto et al. | 192/70.12 |
| 5,897,737 A | * | 4/1999 | Quigley | 156/265 |
| 6,283,265 B1 | * | 9/2001 | Hirayanagi et al | 192/70.12 |

FOREIGN PATENT DOCUMENTS

| | | | |
|---|---|---|---|
| JP | 4-136524 A | * | 5/1992 |
| JP | 4-194422 A | * | 7/1992 |
| JP | 8-166025 A | * | 6/1996 |
| JP | 10-318308 | | 12/1998 |
| JP | 11-141570 | | 5/1999 |

* cited by examiner

*Primary Examiner*—Rodney H. Bonck
(74) *Attorney, Agent, or Firm*—Oblon, Spivak, McClelland, Maier & Neustadt, P.C.

(57) ABSTRACT

A wet type friction member includes a core plate, a plurality of segmental friction units and oil grooves. The segmental friction units are bonded on the core plate at intervals in a ring-shaped manner. The oil grooves are demarcated and formed by facing end surfaces of neighboring two pieces of the segmental friction units, and connect an inner peripheral side of the core plate with an outer peripheral side thereof. At least one of the facing end surfaces of the segmental friction units have a cut-off portion, which is cut off inwardly, at an inner peripheral side end of the facing end surfaces and/or an intermediate portion thereof. The oil grooves are provided with a major-width portion of a wide groove width by the cut-off portion at an inner peripheral side opening of the oil grooves and/or an intermediate portion thereof.

10 Claims, 12 Drawing Sheets

WET TYPE FRICTION MEMBER

BACKGROUND OF THE INVENTION

1. Field of the Invention

The present invention relates to a wet type friction member. More particularly, it relates to a wet type friction member, which is constituted by bonding a plurality of segments of a friction member (i.e., segmental friction units) on a core plate.

2. Description of the Related Art

A wet type friction member is generally used a lot in an automotive clutch disk, and so on. In this case, the wet type friction member is usually constituted by a ring-shaped core plate and friction units, which are bonded on a surface of the core plate in a ring-shaped manner. The surface bonded with the friction units makes a friction surface.

Since such a wet type friction member is used a lot in a clutch disk, and so forth, it is required to exhibit an appropriate friction coefficient and a less dragging torque. Moreover, the friction surface generates heat by friction, it is also needed to be good in terms of a heat resistance and a heat resistant longevity.

Accordingly, in order to secure the heat resistance for the wet type friction member, oil grooves have been disposed conventionally in the friction surface of the wet type friction member so that the heated friction surface, specifically, the friction units, which are bonded on the core plate, are cooled by an oil, which passes through the oil grooves. When the wet type friction member is used as a clutch disk, there arises a centrifugal force and the oil is flowed by the centrifugal force in the oil grooves from the inner peripheral side of the core plate to the outer peripheral side thereof, because the wet type friction member rotates about the axial center.

As a method for providing the oil grooves, a plurality of segmental friction units have been conventionally bonded on the core plate at intervals in a ring-shaped manner, and the resulting intervals have been utilized as the oil grooves. Namely, it is a method, in which the oil grooves, which connect the inner peripheral side of the core plate with the outer peripheral surface thereof, are demarcated and formed by the facing end surfaces of the neighboring segmental friction units. For example, as illustrated in FIG. 19, as such a wet type friction member, there has existed a wet type friction member, in which the facing end surfaces, demarcating and forming the oil groove, of the segmental friction units are linear so that the resulting oil grooves are also linear and the groove width of the oil grooves is substantially constant.

Although the wet type friction member, in which the oil grooves are linear and have a substantially constant groove width, is improved in terms of the cooling performance, compared with a conventional wet type friction member, which is not provided with the grooves. However, there is a problem in that the cooling performance is still insufficient.

Hence, a large variety of improvements have been developed on the shape of the oil grooves. For instance, in Japanese Unexamined Patent Publication (KOKAI) No. 10-318,308 and Japanese Unexamined Patent Publication (KOKAI) No. 11-141,570, there are disclosed oil grooves of various configurations. In these publications, there are disclosed various configurations for oil grooves, which connect the inner peripheral side of the core plate with the outer peripheral side thereof, oil grooves which are opened on the inner peripheral side of the core plate but are not opened on the outer peripheral side thereof, and so forth. However, these configurations do not necessarily result in the sufficient improvement on the cooling performance.

SUMMARY OF THE INVENTION

It is therefore an object of the present invention to provide a wet type friction member, which comprises segmental friction units having a good configuration in terms of the cooling performance, and which exhibits a superb heat resistance. In addition, it is another object of the present invention to provide a wet type friction member, which comprises segmental friction units, which have a configuration being capable of reducing a dragging torque.

Therefore, the inventors of the present invention have earnestly carried out the research and development on the wet type friction member. As a result, they have invented a novel wet type friction member, which is characterized in that it comprises: a core plate; a plurality of segmental friction units bonded on the core plate at intervals in a ring-shaped manner; oil grooves demarcated and formed by facing end surfaces of neighboring two pieces of the segmental friction units, and connecting an inner peripheral side of the core plate with an outer peripheral side thereof; at least one of the facing end surfaces of the segmental friction units having a cut-off portion, being cut off inwardly, at an inner peripheral side end of the facing end surfaces and/or an intermediate portion thereof; and the oil grooves being provided with a major-width portion of a wide groove width by the cut-off portion at an inner peripheral side opening of the oil grooves and/or an intermediate portion thereof.

Since the oil, which passes in the oil grooves, exhibits a cooling effect, the portions adjacent to the oil grooves exhibit a high cooling effect but the portions between the oil grooves, in which the oil does not flow, exhibit a low cooling effect. Accordingly, in the oil grooves, which are linear and which have a substantially constant groove width, the oil flows too smoothly to fully utilize the cooling effect of the passing oil.

Hence, in the wet type friction member according to the present invention, the facing end surfaces of the segmental friction units, which demarcate and form the oil grooves, are provided with the cut-off portion, which is cut off inwardly, at an inner peripheral side end of the facing end surfaces and/or an intermediate portion thereof. Accordingly, the facing end surfaces are made non-linear. By thus providing the cut-off portion, the present wet type friction member has the oil grooves, whose groove width is not constant, and the major-width portion of a wide groove width at an inner peripheral side end of the facing end surfaces and/or an intermediate portion thereof. To put it differently, the oil grooves have the major-width portion having a wide groove width, and a minor-width portion, which has a groove width narrower than that of the major-width portion.

When the oil grooves have the major-width portion and the minor-width portion by providing the facing end surfaces with the cut-off portion, which is cut off inwardly, the oil, which flows in the oil grooves from the inner peripheral side to the outer peripheral side, is dammed temporarily by a point where the groove width varies, for example, at a point where the oil grooves change from the major-width portion to the minor-width portion, a part of the oil overflows onto the surface of the segmental friction units, and consequently flows on the segmental friction units.

Therefore, the present wet type friction member can be improved in terms of the cooling effect and can be enhanced in terms of the heat resistance by thus supplying the oil over a wide area of the segmental friction units.

Moreover, in the idling, the oil, flowing in the oil grooves from the inner peripheral side to the outer peripheral side, is dammed at the point where the groove width changes, a part of the oil flows out onto the surface of the segmental friction units. However, according to the present invention, it is possible to suppress the present wet type friction member from contacting with a mating plate, and to reduce the dragging torque.

Thus, the present wet type friction member can be improved in terms of the cooling effect, and can be enhanced in terms of the heat resistance. Moreover, it can be suppressed from contacting with a mating member, and can exhibit a reduced dragging torque.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
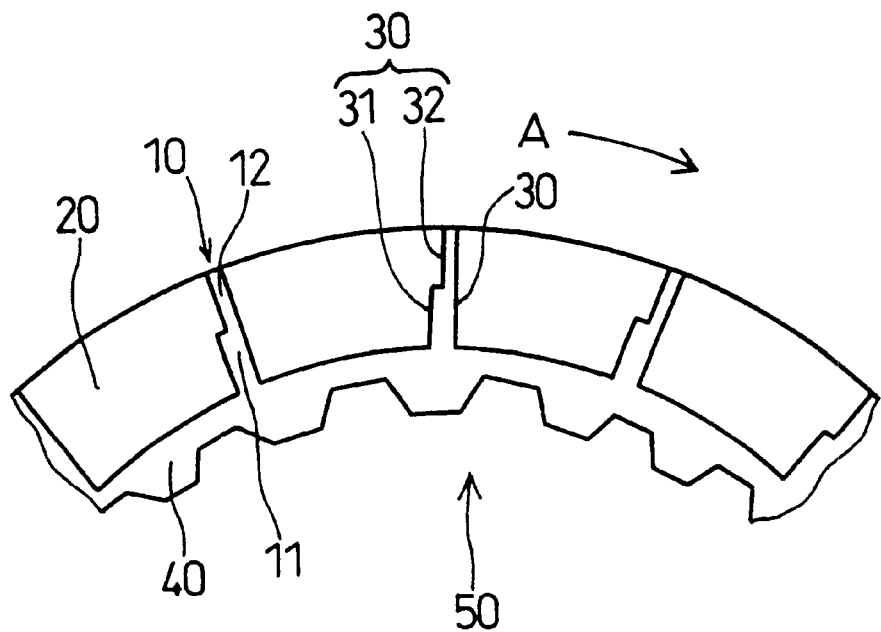
FIG. 1 is a drawing for illustrating a partial configuration of a wet type friction member of Example No. 1.

Having generally described the present invention, a further understanding can be obtained by reference to the specific preferred embodiments which are provided herein for the purpose of illustration only and not intended to limit the scope of the appended claims.

Hereinafter, preferred forms of the present wet type friction member will be described in detail. The wet type friction member comprises a core plate, a plurality of segmental friction units and oil grooves. The segmental friction units are bonded on the core plate at intervals in a ring-shaped manner. The oil grooves are demarcated and formed by facing end surfaces of neighboring two pieces of the segmental friction units, and connect an inner peripheral side of the core plate with an outer peripheral side thereof. The following are one of the characteristics of the present wet type friction member: namely; at least one of the facing end surfaces of the segmental friction units has a cut-off portion, which is cut off inwardly, at an inner peripheral side end of the facing end surfaces and/or an intermediate portion thereof; and the oil grooves are provided with a major-width portion of a wide groove width by the cut-off portion at an inner peripheral side opening of the oil grooves and/or an intermediate portion thereof.

The present wet type friction member comprises the core plate and a plurality of the segmental friction units. It is usually possible to form a configuration of the core plate as a ring-shaped configuration, which is constituted by an outer periphery and an inner periphery. It is possible to use a segmental friction unit, which is selected from the group consisting of ordinarily used segmental friction units, as the segmental friction units. For example, in addition to a paper facing friction unit, it is possible to use a friction unit, such as a resin mold friction unit, a woven mold friction unit, a semi-metallic friction unit, a ceramic friction unit, etc.

The segmental friction units are bonded on the core plate. It is possible to bond the segmental friction units on both of the opposite surfaces of the core plate or on either one of the opposite surfaces. It is possible to carry out the bonding by the methods, which are carried out usually.

The segmental friction units are bonded on the core plate at intervals in a ring-shaped manner. Since the segmental friction units are bonded at intervals, the oil grooves are demarcated and formed by the facing end surfaces of the neighboring segmental friction units, i.e., by the two facing end surfaces. Thus, it is possible to form the oil grooves, which connect the inner peripheral side of the core plate and the outer peripheral side thereof, on the surface of the present wet type friction member. In this case, it is preferable to bond the segmental friction units at equal intervals. As described above, the intervals are utilized as the oil grooves. Accordingly, when the segmental friction units are bonded at equal intervals, it is possible to equally form the oil grooves, to equally pass the oil on the surface of the present wet type friction member, and to equally exhibit the cooling effect over the entire present wet type friction member.

In the present wet type friction member, either one of the facing end surfaces, which demarcate and form the oil grooves, or both of them have the cut-off portion, which is cut off inwardly into the segmental friction units. In general, when the end surfaces of the segmental friction units are not provided with the cut-off portion, they basically have a linear configuration, which extends from the inner peripheral side to the outer peripheral side in a radial direction. While, in the present wet type friction member, the facing end surfaces are provided with the cut-off portion at the inner peripheral side end and/or the intermediate portion. Namely, in the present wet type friction member, it is possible to dispose the cut-off portion at the inner peripheral side end of the facing end surfaces, or to dispose it at the intermediate portion thereof. Further, it is possible to dispose two or more cut-off portions at the intermediate portion. Furthermore, it is possible to dispose the cut-off portions at both of the inner peripheral side end and intermediate portion of the facing end surfaces. The facing end surfaces excluding the cut-off portion, or a cut-free portion, i.e., the facing end surfaces which are free from the cut-off portion, has a linear configuration, which extends in a radial direction. Accordingly, the facing end surfaces come to have the cut-off portion, which is cut off inwardly, and the linear cut-free portion, which extends in a radial direction.

By thus providing the facing end surfaces with the cut-off portion at the inner peripheral side end and/or the intermediate portion, it is possible to form a major-width portion of a major width at an inner peripheral side opening of the oil grooves and/or an intermediate portion thereof. Namely, it is possible to form the major-width portion at the inner peripheral side opening of the oil grooves. Further, it is possible to form the major-width portion at the intermediate portion thereof. Furthermore, it is possible to dispose two or more major-width portions at the intermediate portion. Moreover, it is possible to form the major-width portions at both of the opening and intermediate portion.

The configuration of the cut-off portion is not limited in particular as far as the facing end surfaces are formed so as to be cut off inwardly. To form the facing end surfaces so as to be cut off inwardly can also mean that the facing end surfaces are curved inwardly into the segmental friction units. Namely, the cut-off portion is a portion which is curved inwardly into the segmental friction units. Accordingly, the major-width portion of the oil grooves has a wider groove width than that of the minor-width portion by such a curvature that the facing end surfaces are curved inwardly.

For example, when the cut-off portion is disposed at the intermediate portion of the facing end surfaces, it is possible to dispose the cut-off portion so as to draw an arc, e.g., a substantially letter "C" shape, inside the facing end surfaces by making a cut-off portion so as to remove a substantially semi-circle at the intermediate portion of the facing end surfaces. Further, it is possible to dispose the cut-off portion so as to draw a dogleg shape inside the facing end surfaces by making a cut-off portion so as to remove a triangle at the intermediate portion of the facing end surfaces. Furthermore, it is possible to dispose the cut-off portion so as to draw a letter "U" shape, which is turned in the clockwise or counterclockwise direction by 90 degrees, inside the facing end surfaces by making a cut-off portion so as to remove a rectangle at the intermediate portion of the facing end surfaces.

On the other hand, when the cut-off portion is disposed at the inner peripheral side end of the facing end surfaces, it is possible to dispose the cut-off portion so as to draw an inverted letter "L" shape, which appears so when the facing end surfaces are viewed from the inner peripheral end, inside the facing end surfaces by making a cut-off portion so as to remove a rectangle at the inner peripheral side end of the facing end surfaces.

Anyway, the configuration of the cut-off portion is not limited in particular as aforementioned. In short, the facing end surfaces can be constituted so that the oil overflows out of the oil grooves by curving the facing end surfaces inside the segmental friction units.

Note that it is possible to dispose the cut-off portion in both of the facing end surfaces or to dispose it in only one of the facing end surfaces. When the cut-off portion is disposed in both of the facing end surfaces, it is preferred that the facing end surfaces can be disposed linearly symmetrically with respect to the center line of the oil grooves. When the facing end surfaces are thus disposed linearly symmetrically with respect thereto, the difference between the groove width of the major-width portion and that of the minor-width portion enlarges so that the oil, which passes in the oil grooves, is likely to overflow. When the cut-off is disposed in only one of the facing end surfaces, it is preferred that the cut-off portion can be disposed on a trailing side of the facing end surfaces with respect to a rotational direction of the present wet type friction member. This is because a larger amount of the oil overflows out of the oil grooves on the trailing side of the facing end surfaces than on the leading side thereof.

Further, in the present wet type friction member, at least one of the oil grooves, which are demarcated and formed by the facing end surfaces of the neighboring segmental friction units, can have the major-width portion. However, it is preferred that all of the oil grooves can have the major-width portion. When all of the oil grooves have the major-width portion, the oil overflows onto the surface of all of the segmental friction units so that the oil can flow on the surface of the segmental friction units.

Furthermore, it is possible to alternately combine the oil grooves, which are provided with the major-width portion, and the oil grooves, which are free from the major-width portion. Even when the oil grooves are thus combined, the oil grooves, which are provided with the major-width portion, exist alternately. Accordingly, it is possible to uniformly flow the oil on the surface of the segmental friction units.

Note that it is possible to form these segmental friction units as the aforementioned configurations in advance and to bond them on the core plate thereafter.

When the thus constituted present wet type friction member is utilized as a clutch disk, etc., and when it is rotated about the axial center, the oil is flowed from the inner peripheral side to the outer peripheral side by a centrifugal force. However, since the oil grooves are provided with the major-width portion, the oil can go beyond the facing end surfaces of the segmental friction units and can flow out onto the segmental friction units at positions where the groove width changes from the major-width portion to the minor-width portion.

Thus, in the present wet type friction member, the oil is flowed by the centrifugal force not only in the oil grooves but also onto the segmental friction units. Accordingly, the cooling effect due to the oil is improved to that extent, and the heat resistance of the present wet type friction member can be enhanced. Moreover, since the oil flows on the segmental friction units, the present wet type friction member is thereby suppressed from contacting with a mating plate. Thus, it is possible to reduce the dragging torque.

Specific examples of the present wet type friction member will be hereinafter described with reference to the drawings.

In the following descriptions on Example Nos. 1 through 8, note that, regarding the reference numerals used in the drawings, the like numerals shall designate the like component members. In addition, a wet type friction members 50 of Example Nos. 1 through 8 hereinafter described are common in that they comprise a core plate 40 and a plurality of segmental friction units 20 bonded on the core plate 40 at intervals in a ring-shaped manner, and in that oil grooves 10, which connect an inner peripheral side of the core plate 40 with an outer peripheral side thereof, are demarcated and formed by facing end surfaces 30 of the neighboring two segmental friction units 20. Accordingly, the present wet type friction member will be hereinafter described on the assumption that it is such a wet type friction member 50.

(Example No. 1)

FIG. 1 illustrates a partial configuration of the wet type friction member 50 of Example No. 1. The rotational direction of the wet type friction member 50 is designated at "A". In the wet type friction member 50 of Example No. 1, the facing end surface 30, which is disposed on the trailing side with respect to the rotational direction "A", of the facing end surfaces 30 has a cut-off 31, which is cut off inwardly, at the inner peripheral side end. The cut-off 31 has a configuration, which is made by removing a substantial quadrangle from the facing end surface 30. The facing end surface 30 having the cut-off 31 has a linear-shaped cut-free portion 32, which extends in a radial direction, on the outer peripheral side of the cut-off 31. Moreover, the other one of the facing end surfaces 30 is free from the cut-off portion 31. Consequently, the facing end surface 30, which is disposed on the other side, includes the linear-shaped end surface, which extends in a radial direction, only.

The oil grooves 10 has a major-width portion 11 of a wide groove width, which is made by the cut-off 31, at the inner peripheral side opening. On the outer peripheral side of the major-width portion 11, there is positioned a minor-width portion 12, which has a narrower groove width than that of the major-width portion 11. In Example No. 1, all of the grooves 10 are constituted so that they have the major-width portion 11 and the same configuration.

Figure 2:
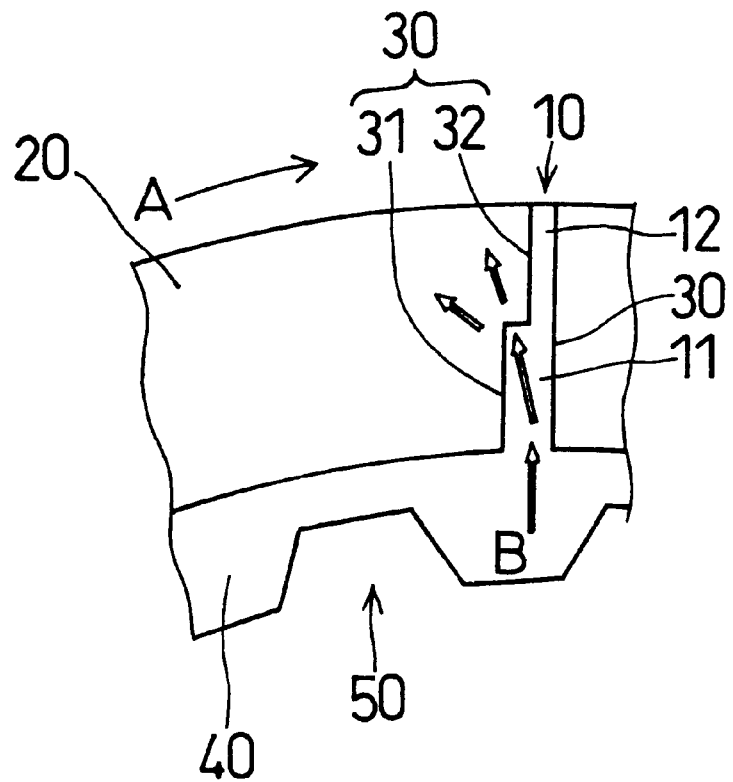
FIG. 2 is a drawing for enlargedly illustrating a partial configuration of the wet type friction member of Example No. 1.

In FIG. 2, there is illustrated a drawing, which further enlarges a partial configuration of the wet type friction member 50 of Example No. 1. When the wet type friction member 50 is rotated, the oil is flowed from the inner peripheral side to the outer peripheral side by a centrifugal force as designated at "B". However, at a position where the oil groove 10 changes from the major-width portion 11 to the minor-width portion 12, the oil is dammed by the cut-off portion 31 of the facing end surface 30, overflows out of the oil groove 10, and eventually flows out onto the segmental friction unit 20.

Thus, in the wet type friction member 50, since the oil not only passes the oil grooves 10 but also flows on the segmental friction units 20, it is possible to cool the segmental friction units 20 and to improve the heat resistance of the wet type friction member 50. Moreover, since the oil is supplied onto the surface of the segmental friction units 20, it is possible to reduce the dragging torque.

(Example No. 2)

Figure 3:
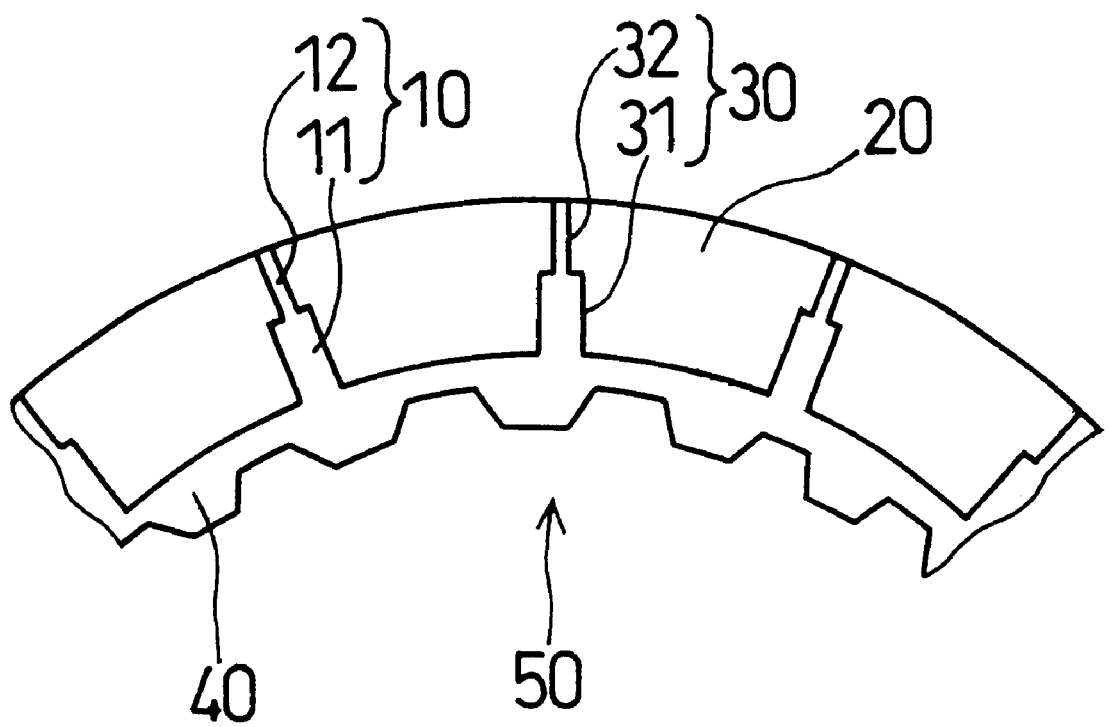
FIG. 3 is a drawing for illustrating a partial configuration of a wet type friction member of Example No. 2.

FIG. 3 illustrates a partial configuration of the wet type friction member 50 of Example No. 2. In the wet type friction member 50 of Example No. 2, both of the two neighboring facing end surfaces 30 have the cut-off 31, which is cut inwardly, at the inner peripheral side end. The cut-off 31 has a configuration, which is made by removing a substantial quadrangle from the facing end surfaces 30. The facing end surfaces 30 having the cut-off 31 have linear-shaped cut-free portions 32, which extend in radial directions, respectively, on the outer peripheral side of the cut-off portions 31. Both of the two facing end surfaces 30 have the cut-off portion 31, and accordingly the two facing end surfaces 30 are constituted so as to be disposed linearly symmetrically with respect to the center line of the oil grooves 10.

The oil grooves 10 have a major-width portion 11 of a wide groove width, which is made by the cut-off portion 31, at the inner peripheral side opening. On the outer peripheral side of the major-width portion 11, there is positioned a minor-width portion 12, which has a narrower groove width than that of the major-width portion 11. Moreover, in Example No. 2, all of the grooves 10 are constituted so that they have the major-width portion 11 and the same configuration.

In this example, the cut-off portion 31 is disposed in both of the two facing end surfaces 30, respectively. The oil, which passes through the oil grooves 10, is dammed at the cut-off portions 31, and flows out onto the surface of the both of the neighboring segmental friction units 20, which demarcate and form the oil grooves 10 by the facing end surfaces 30. Since the cut-off portions 31 are disposed linearly symmetrically with respect to the center line of the oil grooves 10, the groove width changes so suddenly that the oil is more likely to overflow out of the oil grooves 10.

Thus, in this example as well, since the oil not only passes the oil grooves 10 but also flows on the surface of the segmental friction units 20, it is possible to cool the segmental friction units 20 and to improve the heat resistance of the wet type friction member 50. Moreover, since the oil is supplied onto the surface of the segmental friction units 20, it is possible to reduce the dragging torque.

(Example No. 3)

Figure 4:
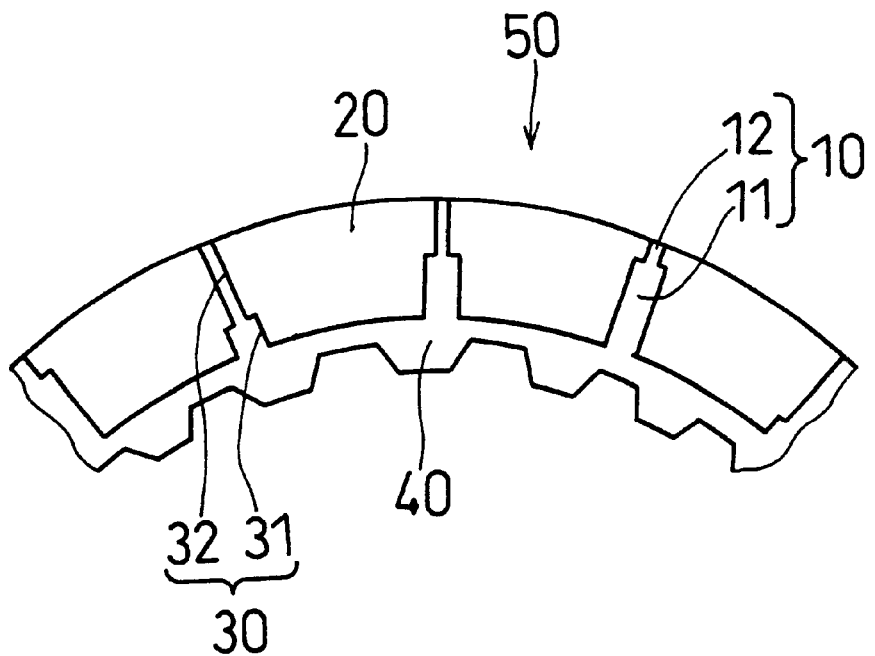
FIG. 4 is a drawing for illustrating a partial configuration of a wet type friction member of Example No. 3.

FIG. 4 illustrates a partial configuration of the wet type friction member 50 of Example No. 3. In the wet type friction member 50 of Example No. 3, both of the two facing end surfaces 30 have the cut-off portion 31, which is cut inwardly, at the inner peripheral side end. The cut-off 31 has a configuration, which is made by removing a substantial quadrangle from the facing end surfaces 30. The facing end surfaces 30 having the cut-off 31 have linear-shaped cut-free portions 32, which extend in radial directions, respectively, on the outer peripheral side of the cut-off portions 31. Both of the two facing end surfaces 30 have the cut-off portion 31, and accordingly the two facing end surfaces 30 are constituted so as to be disposed linearly symmetrically with respect to the center line of the oil grooves 10.

The oil grooves 10 have a major-width portion 11 of a wide groove width, which is made by the cut-off 31, at the inner peripheral side opening. On the outer peripheral side of the major-width portion 11, there is positioned a minor-width portion 12, which has a narrower groove width than that of the major-width portion 11. Further, the facing end surfaces 30 are constituted so as to be linearly symmetrically with respect to the center line of the oil grooves 10. Furthermore, all of the grooves 10 are constituted so that they have the aforementioned major-width portion 11, but a radial length of the major-width portion 11 differs for each of the oil grooves 10.

In this example, the cut-off portion 31 is disposed in both of the two facing end surfaces 30, respectively. The oil, which passes through the oil grooves 10, is dammed at the cut-off portions 31, and flows out onto the surface of the both of the neighboring segmental friction units 20, which demarcate and form the oil grooves 10 by the facing end surfaces 30. Since the cut-off portions 31 are disposed linearly symmetrically with respect to the center line of the oil grooves 10, the groove width changes so suddenly that the oil is more likely to overflow out of the oil grooves 10.

Thus, in this example as well, since the oil not only passes the oil grooves 10 but also flows on the surface of the segmental friction units 20, it is possible to cool the segmental friction units 20 and to improve the heat resistance of the wet type friction member 50. Moreover, since the oil is supplied onto the surface of the segmental friction units 20, it is possible to reduce the dragging torque.

(Example No. 4)

Figure 5:
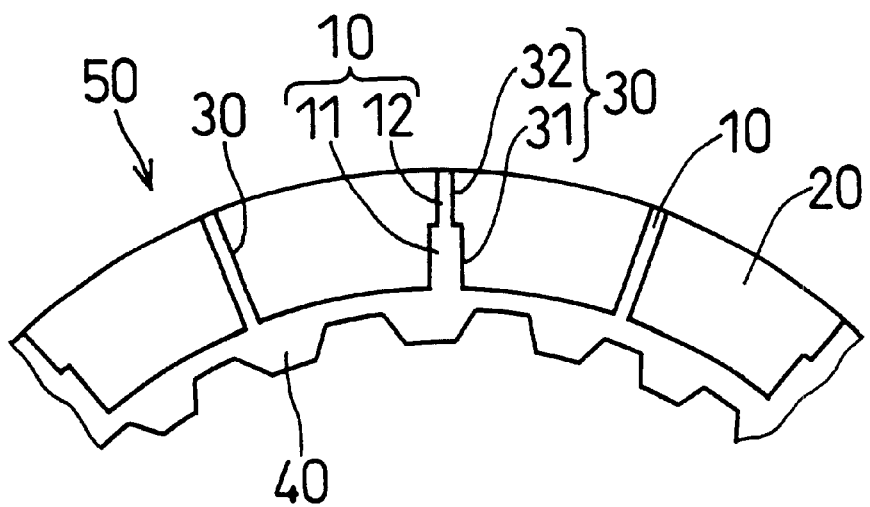
FIG. 5 is a drawing for illustrating a partial configuration of a wet type friction member of Example No. 4.

FIG. 5 illustrates a partial configuration of the wet type friction member 50 of Example No. 4. In the wet type friction member 50 of Example No. 4, the oil grooves 10 having the major-width portion 11 and the oil grooves 10 being free from the major-width portion 11 are combined alternately. The oil grooves 10 having the major-width portion 11 are identical with the oil grooves 10 described in Example No. 2. Accordingly, since the descriptions on the oil grooves 10 having the major-width portion 11 are basically identical with the description on the oil grooves 10 in Example No. 2, the descriptions set forth in Example No. 2 substitute for the descriptions herein.

The oil grooves 10 being free from the major-width portion 11 are demarcated and formed by the two linear-shaped facing end surfaces 30, which are free from the cut-off portion 11 and which extend in radial directions, respectively. Thus, the oil grooves 10, which are free from the major-width portion 11, have a constant groove width, and are formed as a linear configuration.

Thus, in Example No. 4, a larger amount of the oil flows out of the oil grooves 10 having the major-width portion 11 than out of the oil grooves 10 being free from the major-width portion 11, and the oil flows onto both of the segmental friction units 20, which demarcate and form the oil grooves 10. Accordingly, since the oil not only passes the oil grooves 10 but also flows on the surface of the segmental friction units 20, it is possible to cool the segmental friction units 20 and to improve the heat resistance of the wet type friction member 50. Moreover, since the oil is supplied onto the surface of the segmental friction units 20, it is possible to reduce the dragging torque.

(Example No. 5)

Figure 6:
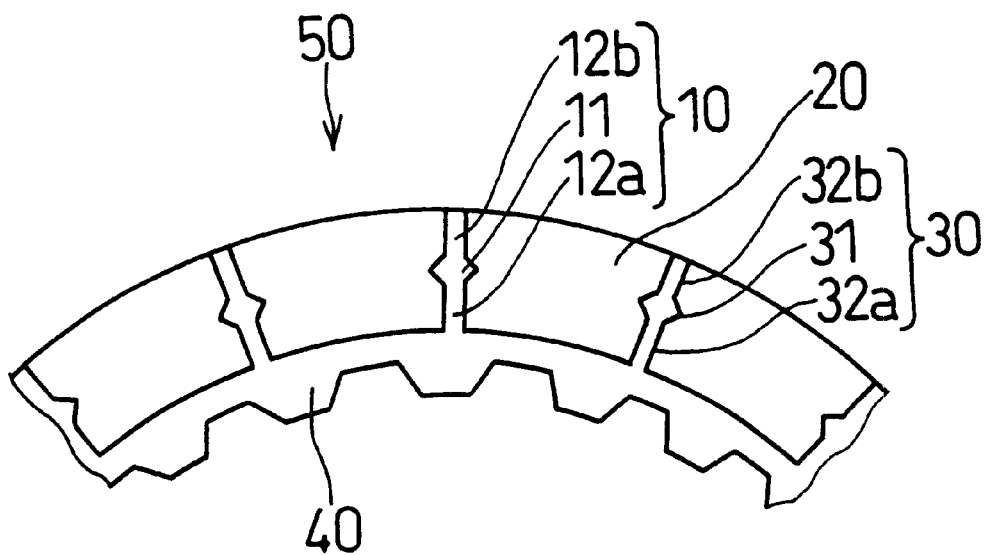
FIG. 6 is a drawing for illustrating a partial configuration of a wet type friction member of Example No. 5.

FIG. 6 illustrates a partial configuration of the wet type friction member 50 of Example No. 5. In the wet type friction member 50 of Example No. 5, both of the two facing end surfaces 30 have the cut-off portion 31, which is cut off inwardly, at the intermediate portion of the facing end surfaces 30. The cut-off portion 31 has a configuration, which is made by removing a substantial triangle from the intermediate portion of the facing end surfaces 30. Namely, the facing end surfaces 30 are curved like a dogleg shape inwardly at the cut-off portion 31. The facing end surfaces 30 having the cut-off portion 31 have cut-free portions 32a, 32b, which extend to the inner peripheral side and to the outer peripheral side, respectively, in radial directions. Both of the two facing end surfaces 30 have the cut-off portion 31, and the respective facing end surfaces 30 are constituted so as to be disposed linearly symmetrically with respect to the center line of the oil grooves 10.

The oil grooves 10 are made to have the major-width portion 11 of a wide groove width by the cut-off portion 31 at the intermediate portion thereof. The minor-width portions 12a, 12b, which have a narrower groove width than that of the major-width portion 11, are positioned on the inner peripheral side and the outer peripheral side of the major-width portion 11, respectively. Moreover, in this example, all of the oil grooves 10 are constituted so as to have the major-width portion 11.

In this example, the cut-off portion 31 is disposed in both of the two facing end surfaces 30. Hence, the oil, which passes through the oil grooves 10, is dammed at the cut-off portions 31, and flows out onto the surface of the both of the neighboring segmental friction units 20, which demarcate and form the oil grooves 10 by the facing end surfaces 30. Since the cut-off portions 31 are disposed linearly symmetrically with respect to the center line of the oil grooves 10, the groove width changes so suddenly that the oil is more likely to overflow out of the oil grooves 10.

Thus, in this example as well, since the oil not only passes the oil grooves 10 but also flows on the surface of the segmental friction units 20, it is possible to cool the segmental friction units 20 and to improve the heat resistance of the wet type friction member 50. Moreover, since the oil is supplied onto the surface of the segmental friction units 20, it is possible to reduce the dragging torque.

(Example No. 6)

Figure 7:
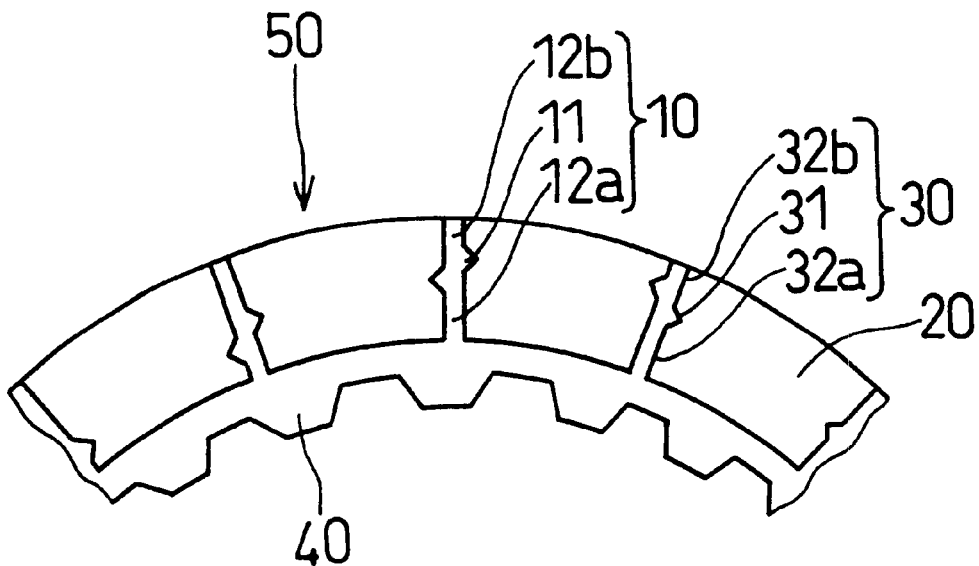
FIG. 7 is a drawing for illustrating a partial configuration of a wet type friction member of Example No. 6.

FIG. 7 illustrates a partial configuration of the wet type friction member 50 of Example No. 6. In the wet type friction member 50 of Example No. 6, the two facing end surfaces 30 have the cut-off portion 31, which is cut off inwardly, at the intermediate portion of the facing end surfaces 30. The cut-off portion 31 has a configuration, which is made by removing a substantial triangle from the intermediate portion of the facing end surfaces 30. Namely, the facing end surfaces 30 are curved like a dogleg shape inwardly at the cut-off portion 31. The facing end surfaces 30 having the cut-off portion 31 have cut-free portions 32a, 32b, which extend to the inner peripheral side and to the outer peripheral side, respectively, in a radial direction. Although both of the two facing end surfaces 31 have the cut-off portion 31, the positions, at which the facing end surfaces 30 have the cut-off portion 31, differ in two of the facing end surfaces 30, respectively. Accordingly, in this example, the facing end surfaces 30 are not disposed linearly symmetrically with respect to the center line of the oil grooves 10.

The oil grooves 10 are made to have the major-width portion 11 of a wide groove width by the cut-off portion 31 at the intermediate portion thereof. The minor-width portions 12a, 12b, which have a narrower groove width than that of the major-width portion 11, are positioned on the inner peripheral side and the outer peripheral side of the major-width portion 11, respectively. Depending on the positions at which two cut-off portions 31 are disposed, there arises a case where the two major-width portions 31 are formed separately. However, in this example, the two major-width portions 11 are not separated, and are formed as a group. Moreover, in this example, all of the oil grooves 10 are constituted so as to have the major-width portion 11.

In this example, the cut-off portion 31 is disposed in both of the two facing end surfaces 30. Hence, the oil, which passes through the oil grooves 10, is dammed at the cut-off portions 31, and flows out onto the surface of the both of the neighboring segmental friction units 20, which demarcate and form the oil grooves 10 by the facing end surfaces 30.

Thus, in this example as well, since the oil not only passes the oil grooves 10 but also flows on the surface of the segmental friction units 20, it is possible to cool the segmental friction units 20 and to improve the heat resistance of the wet type friction member 50. Moreover, since the oil is supplied onto the surface of the segmental friction units 20, it is possible to reduce the dragging torque.

(Example No. 7)

Figure 8:
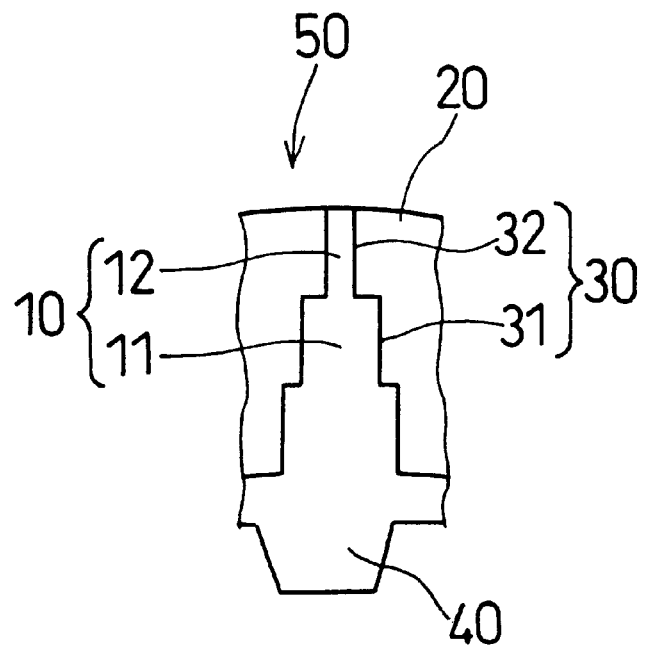
FIG. 8 is a drawing for illustrating a partial configuration of a wet type friction member of Example No. 7.

FIG. 8 illustrates a partial configuration of the wet type friction member 50 of Example No. 7. Example No. 7 is a modified version of Example No. 2. In the wet type friction member 50 of Example No. 7, both of the facing end surfaces 30 have two cut-off portions 31, which are cut off inwardly. The cut-off portion 31 has a configuration, which is made by removing a first substantial quadrangle from the inner peripheral side end of the facing end surfaces 30 and by further removing a second substantial quadrangle from the previously cut inner peripheral side end. Namely, in this example, it is possible to say that the cut-off is carried out twice in the inner peripheral side end. Hence, in this example, the cut-off portion 31 has a so-called two-stage constitution. Moreover, the cut-off portion 31 is disposed in the two facing end surfaces 30, and the two cut-off portions 31 are constituted so as to be linearly symmetrically with respect to the center line of the oil grooves 10. Accordingly, while Example No. 2 is the wet type friction member 50 in which the one cut-off portion 31 is disposed in the one facing end surface 30, this example is the wet type friction member 50, in which the two cut-off portions 31 are disposed in the one facing end surface 30.

The oil grooves 10 are made to have the major-width portion 11 of a wide groove width by the cut-off portion 31 at the inner peripheral side opening thereof. On the outer peripheral side of the major-width portion 11, there is positioned a minor-width portion 12, which has a narrower groove width than that of the major-width portion 11. Moreover, since the cut-off portion 31 is formed as the two-stage constitution, the major-width portion 11 is also formed as a two-stage constitution correspondingly thereto. Accordingly, there are two positions, at which the groove width of the oil grooves 10 varies. In this example, all of the oil grooves 10 are constituted so that they have the major-width portion 11 and have the same configuration.

In this example, the cut-off portion 31 is disposed in both of the two facing end surfaces 30 as a so-called 2-stage constitution. Hence, the oil, which passes through the oil grooves 10, is dammed at the cut-off portion 31 of the 2-stage constitution, and flows out onto the surface of the both of the neighboring segmental friction units 20, which demarcate and form the oil grooves 10 by the facing end surfaces 30. The cut-off portion 31 is formed as such a 2-stage constitution that the oil is more likely to overflow onto the surface of the segmental friction units 20.

Thus, in this example as well, since the oil not only passes the oil grooves 10 but also flows on the surface of the segmental friction units 20, it is possible to cool the segmental friction units 20 and to improve the heat resistance of the wet type friction member 50. Moreover, since the oil is supplied onto the surface of the segmental friction units 20, it is possible to reduce the dragging torque.

(Example No. 8)

Figure 9:
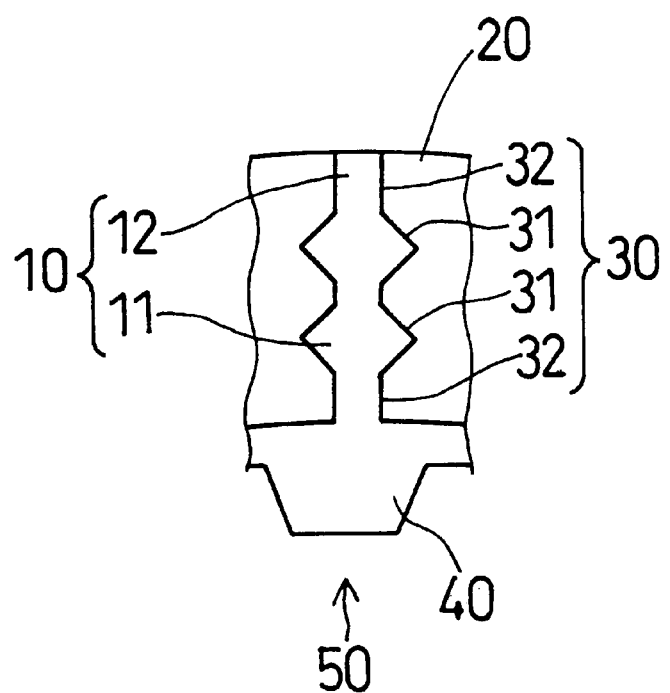
FIG. 9 is a drawing for illustrating a partial configuration of a wet type friction member of Example No. 8.

FIG. 9 illustrates a partial configuration of the wet type friction member 50 of Example No. 8. Example No. 8 is a modified version of Example No. 5. In the wet type friction member 50 of Example No. 8, both of the two facing end surfaces 30 have two cut-off portions 31, which are cut off inwardly. Both of the two cut-off portions 31 have a configuration, which is made by removing two substantial triangles from the intermediate portions of the facing end surfaces 30. Namely, the facing end surfaces 30 are curved like a dogleg shape inwardly. Moreover, the two facing end surfaces 30 are disposed so as to be linearly symmetrically with respect to the center line of the oil grooves 10. Accordingly, while Example No. 5 is the wet type friction member 50, in which the one cut-off portion 31 is disposed in the one facing end surface 30, Example No. 8 is the wet type friction member 50, in which the two cut-off portions 31 are disposed in the one facing end surface 30.

The oil grooves 10 are made to have the two major-width portions 11 of a wide groove width by the cut-off portions 31 at the intermediate portions thereof. On a portion which is interposed by the two major-width portions 11, the outer peripheral opening and the inner peripheral opening, there are formed minor-width portions 12, which have a narrower groove width than that of the major-width portions 11, respectively.

In this example, two cut-off portions 31 are disposed in both of the two facing end surfaces 30, respectively. Hence, the oil, which passes through the oil grooves 10, flows out onto the surface of the both of the neighboring segmental friction units 20, which demarcate and form the oil grooves 10. The cut-off portions 31 are disposed linearly symmetrically with respect to the center line of the oil grooves 10 so that the groove width of the oil grooves 10 varies suddenly, and so that the oil is more likely to overflow onto the surface of the segmental friction units 20. Moreover, since the two facing end surfaces 30 have the two cut-off portions 30, respectively, the oil is much more likely to overflows out of the oil grooves 10 to that extent.

Thus, in this example as well, since the oil not only passes the oil grooves 10 but also flows on the surface of the segmental friction units 20, it is possible to cool the segmental friction units 20 and to improve the heat resistance of the wet type friction member 50. Moreover, since the oil is supplied onto the surface of the segmental friction units 20, it is possible to reduce the dragging torque.

Example No. 8 is a modified version of Example No. 6. However, note that, in Example No. 6 as well, it is possible to vary the wet type friction material 50, which employs the facing end surfaces 30 provided with the two cut-off portions 31 instead of the facing end surfaces 30 provided with the one cut-off portion 31. Moreover, as a furthermore modified versions, it is possible to provide the facing end surfaces 30 with not only the two cut-off portions 31 but also three or more of the cut-off portions 31.

(Configuration of Segmental Friction Unit)

The configuration of the segmental friction units, which are employed in the present wet type friction member, will be hereinafter described in further detail. In the following paragraph ① and paragraph ② hereinafter set forth, the cases are described in which the cut-off portion 31 is disposed at the inner peripheral side end of the facing end surface 30. Moreover, in the paragraph ③, the case is described in which the cut-off portion 31 is disposed at the intermediate portion of the facing end surface 30. Note that, regarding the reference numerals used in the following drawings, the like numerals used in the above-described examples shall designate the like component members.

①

Figure 10:
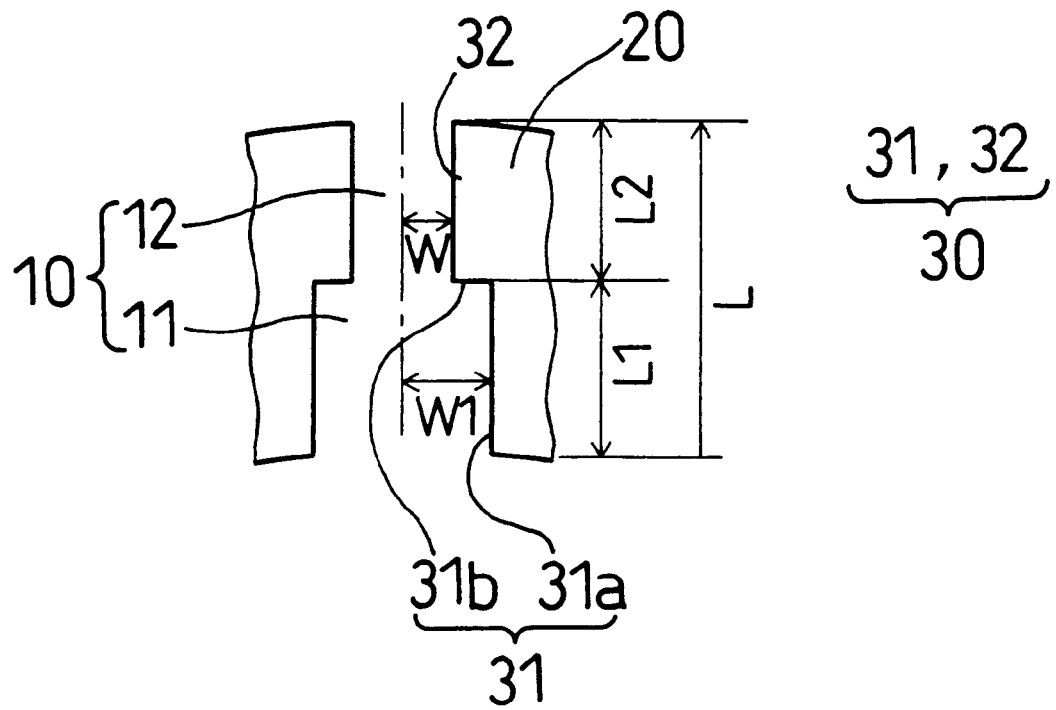
FIG. 10 is a drawing for illustrating a configuration of segmental friction units, which have a cut-off portion at an inner peripheral side end of facing end surfaces.

Firstly, FIG. 10 illustrates segmental friction units 20, which have a cut-off portion 31 at the inner peripheral side end of the facing end surface 30. The cut-off portion 31 has such a configuration that a rectangle is removed from the segmental friction unit 20. The facing end surface 30 of the segmental friction unit 20 is constituted by the cut-off portion 31, which is made by thus cutting off, and a cut-free portion 32, which extends in a radial direction. The cut-off portion 31 is constituted by an end surface 31a, which extends from the inner peripheral side to the outer peripheral side in a radial direction, and an end surface 31b, which extends in a direction toward the other facing end surface 31. The angle between the end surface 31a, which extends in the radial direction, and the end surface 31b which extends in the direction toward the other facing end surface 31, is a right angle substantially.

Here, an "L" shall designate a length of the segmental friction units in a radial direction, i.e., a length from the inner peripheral side to the outer peripheral side. Further, an "L1" shall designate a length of the radially extending end surface 31a of the facing end surface 31. Furthermore, an "L2" shall designate a length of the cut-free portion 32. Moreover, a "W1" shall designate a length from the center line of the oil groove 10 to the radially extending end surface 31a of the facing end surface 31. In addition, a "W" shall designate a length from the center line of the oil groove 10 to the cut-free portion 32, i.e., the portion excluding the cut-off portion 31.

In this case, it is preferred that the "L1" can fall in a range of from 10 to 90% of the "L". When the "L1" is less than 10%, the oil, which is supplied onto the surface of the segmental friction units 20, becomes insufficient. Moreover, it is preferred that the "L2" can fall in a range of from 10 to 90% of the "L". When the "L2" is less than 10%, the strength becomes insufficient on the outer peripheral side of the segmental friction unit 20.

The "W1" can preferably be adjusted so as to fall in a range of from 1.3 to 5.0 times, further preferably in a range of from 1.5 to 3.0 times, of the "W". When the "W1" is less than 1.3 times of the "W", the oil is supplied insufficiently onto the surface of the segmental friction unit 20. When the "W1" exceeds 5.0 times of the "W", the oil film is formed excessively onto the surface of the segmental friction unit 20 so that the frictional force lowers too much when the resulting wet type friction member engages with a mating member.

②

Figure 11:
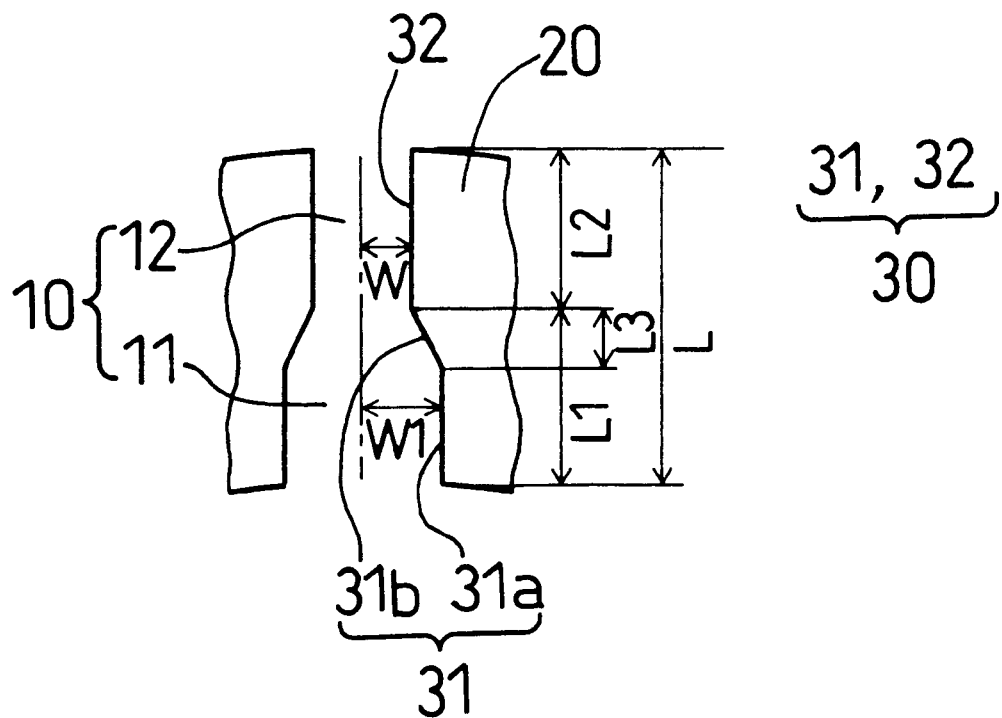
FIG. 11 is a drawing for illustrating a configuration of segmental friction units, which have a cut-off portion at an inner peripheral side end of facing end surfaces.

Secondly, FIG. 11, similarly to the segmental friction units 20 set forth in the paragraph ①, illustrates segmental friction units 20, which have a cut-off portion 31 at an inner peripheral side end of the facing end surface 30. The cut-off portion 31 has such a configuration that a trapezoid, one of whose sides is inclined, is removed from the segmental friction units 20. The facing end surface 30 of the segmental friction unit 20 is constituted by the cut-off portion 31, which is cut off, and cut-free portion 32, which extends in a radial direction. Namely, also in the segmental friction unit 20 illustrated in FIG. 11, the cut-off portion 31 is constituted by an end surface 31a, which extends in a radial direction, and an end surface 31b, which extends in a direction toward the other facing end surface 30. Note that, however, the angle between the end surface 31a, which extends in the radial direction, and the end surface 31b, which extends in the direction toward the other facing end surface 30, is not vertical, but is an obtuse angle. In this case, when it becomes vertical, that makes the segmental friction units 20 described in the above paragraph ①.

Here, an "L" shall designate a width of the segmental friction unit 20, i.e., a length from the inner peripheral side to the outer peripheral side. Further, "L1" shall designate a length of the cut-off portion 31 in the radial direction. Furthermore, "L2" shall designate a length of the cut-free portion 32. Moreover, "L3" shall designate a radial length of the end surface 31b, which extends in the direction toward the other facing end surface 30.

In addition, "W1" shall designate a length from the center line of the oil groove 10 to the end surface 31a of the radially extending cut-off portion 31. "W" shall designate a length from the center line of the oil groove 10 to the cut-free portion 32, i.e., the facing end surface 30 excluding the cut-off portion 31.

In this case, it is preferred that the "L1" can fall in a range of from 10 to 90% of the "L". When the "L1" is less than 10%, the oil is supplied insufficiently onto the surface of the segmental friction unit 20. Further, it is preferred that the "L2" can fall in a range of from 10 to 90% of the "L". When the "L2" is less than 10%, the strength becomes insufficient on the outer peripheral side of the segmental friction unit 20. Namely, in both of the paragraph ① and the paragraph ②, the radial length of the cut-off portion 31, i.e., the "L1" can preferably fall in a range of from 10 to 90% of the radial length of the segmental friction unit 20, i.e., the "L". Further, it is preferred that the "L3" can be less than 30% of the "L". When the "L3" is 30% or more, the effect of damming the oil, which flows from the inner peripheral side to the outer peripheral side, lowers, and thereby the amount of the oil overflowing onto the surface of the segmental friction unit decreases.

Note that it is possible to say that the segmental friction unit 20 set forth in the paragraph ① is a special form of the segmental friction unit 20 described herein. In this case, it is preferred that an angle between the end surface 31b, which extends toward the other facing end surface 30, and the radially extending end surface 31a can fall in a range of from 90 to 150 degrees. When the cut-off portion 31 has an angle to such an extent, the cut-off portion 31 can effectively dam the oil.

Likewise, the "W1" can preferably be adjusted in a range of from 1.3 to 5.0 times, further preferably in a range of from 1.5 to 3.0 times, of the "W". When the "W1" is less than 1.3 times of the "W", the oil is supplied insufficiently onto the surface of the segmental friction unit 20. When the "W1" exceeds 5.0 times of the "W", the oil film is formed excessively onto the surface of the segmental friction unit 20. As a result, the frictional force lowers when the resulting wet type friction member engages with a mating member.

Figure 12:
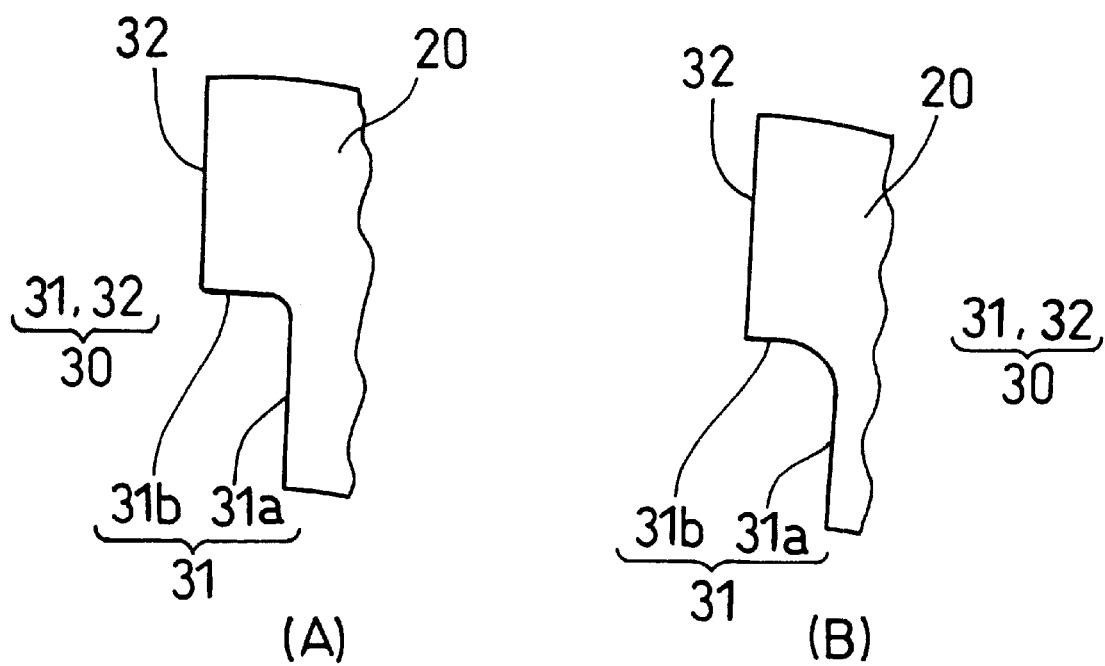
FIG. 12 is a drawing for illustrating a configuration of segmental friction units, which have a cut-off portion at an inner peripheral side end of facing end surfaces.

Note that, the end surface 31a, which extends in the radial direction, and the end surface 31b, which extends toward the other end surface 30, cannot necessarily form such a corner of the cut-off portions 31 as illustrated in FIG. 10 and FIG. 11. Namely, as illustrated in FIGS. 12 (A) and (B), in the cut-off portion 31, an end surface 31a, which extends in a radial direction, and an end surface 31b, which extends toward the other end surface 30, can form a rounded configuration. Note that the cut-off portion 31 illustrated in FIG. 12 (B) has a rounded configuration whose radius is larger than that of the rounded configuration illustrated in FIG. 12 (A).

Thus, even when the end surface 31a, which extends in the radial direction, and the end surface 31b, which extends towards the other facing end surface 30, form the rounded configuration instead of the cornered configuration, the aforementioned descriptions can be properly applied.

③

Figure 13:
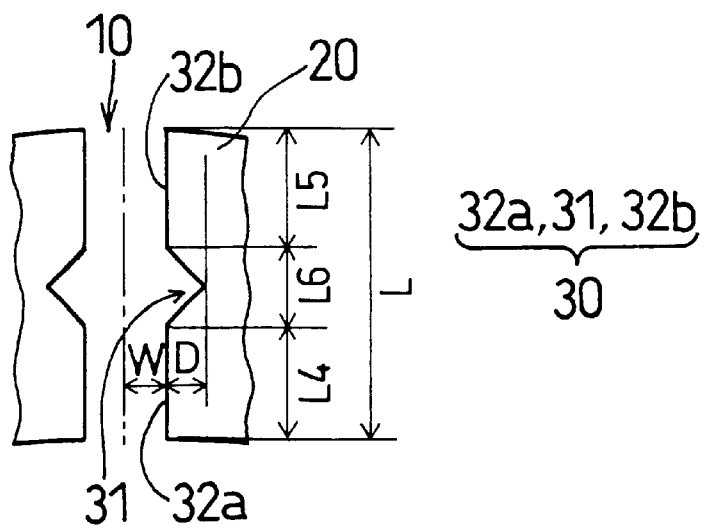
FIG. 13 is a drawing for illustrating a configuration of segmental friction units, which have a cut-off portion at an intermediate portion of facing end surfaces.

Thirdly, FIG. 13 illustrates segmental friction units 20, which have a cut-off portion 31 at an intermediate portion of the facing end surface 30. The cut-off portion 31 has such a configuration that a triangle is removed from the segmental friction unit 20. The configuration of the cut-off portion 31 is a substantially dogleg shape. The facing end surface 30 of the segment friction unit 20 is constituted by a cut-off portion 31, which is curved inwardly, and a cut-free portion 32, which extends in a radial direction. Accordingly, the facing end surface 30 of the segmental friction unit 20 is constituted by the cut-off portion 31, which is curved inwardly as a substantially dogleg shape, and cut-free portions 32a, 32b, which are positioned on the inner peripheral side of the cut-off portion 31 and the outer peripheral side thereof and which extend in a radial direction.

Here, an "L" shall designate a width of the segmental friction unit 20, i.e., a length from the inner peripheral side to the outer peripheral side. An "L4" and an "L5" shall designate the lengths of the two radially extending cut-free portions 32a, 32b, respectively. Further, an "L6" shall designate a length of the cut-off portion 31 in a radial direction. Furthermore, a "D" shall designate a depth, to which the cut-off portion 31 is cut off inside the segmental friction unit 20. Moreover, a "W" shall designate a length from the center line of the oil groove 10 to the cut-free portions 32a, 32b, i.e., the facing end surface 30 excluding the cut-off portion 31.

In this case, it is preferred that the "L4" can fall in a range of from 10 to 80% of "L", that the "L5" can fall in a range of from 10 to 80% of "L", and that the "L6" can fall in a range of from 5 to 30% of the "L", respectively. When the "L4" is less than 10% of the "L", the strength becomes insufficient on the inner peripheral side of the segmental friction unit 20. Further, when the "L5" is less than 10% of the "L", the strength becomes insufficient on the outer peripheral side of the segmental friction unit 20. When the "L6" exceeds 30% of "L", the oil resides in the cut-off portion 31 so much that the oil is supplied excessively onto the surface of the segmental friction unit 20, and that the oil film enlarges excessively on the surface of the segmental friction unit 20. As a result, the frictional force lowers when the resulting wet type friction member engages with a mating member. On the contrary, when the "L6" is less than 5% of "L", the oil is supplied insufficiently onto the surface of the segmental friction unit 20.

Further, the "D" can preferably be adjusted in a range of from 0.3 to 5.0 times, further preferably in a range of from 0.5 to 2.0 times, of the "W". When the "D" is less than 0.3 times of the "W", the oil is supplied insufficiently onto the surface of the segmental friction unit 20. When the "D" exceeds 5.0 times of the "W", the oil is supplied excessively onto the surface of the segmental friction unit 20 so that the oil film enlarges excessively on the surface of the segmental friction units 20. As a result, the frictional force lowers too much when the resulting wet type friction member engages with a mating member.

④

Figure 14:
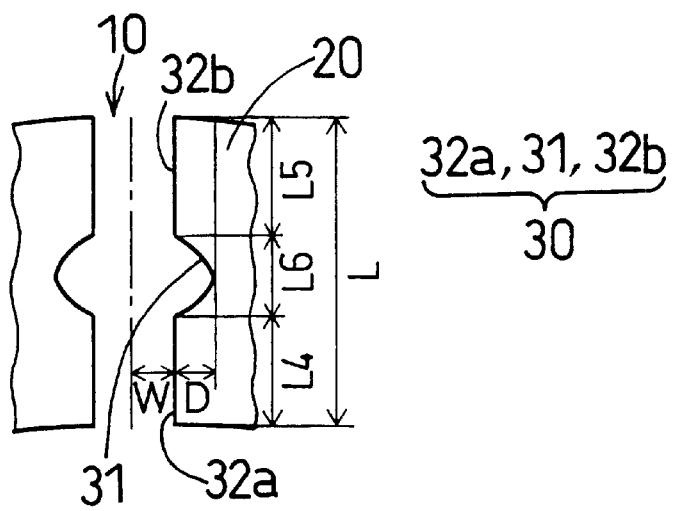
FIG. 14 is a drawing for illustrating a configuration of segmental friction units, which have a cut-off portion at an intermediate portion of facing end surfaces.
Figure 15:
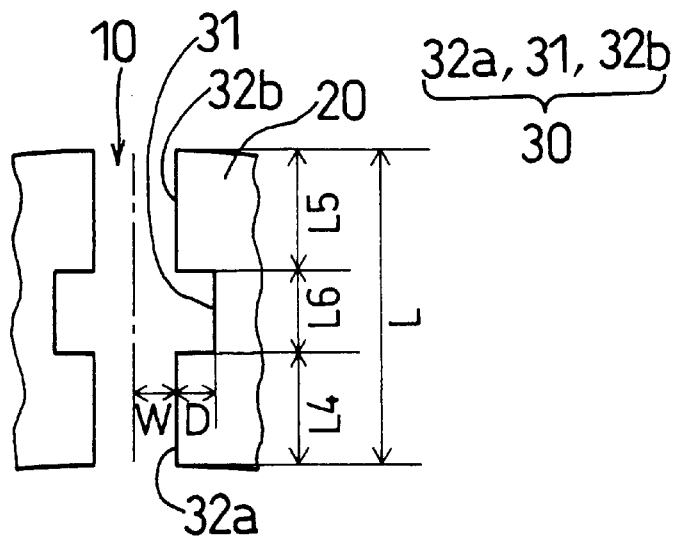
FIG. 15 is a drawing for illustrating a configuration of segmental friction units, which have a cut-off portion at an intermediate portion of facing end surfaces.

Fourthly, FIG. 14 and FIG. 15 illustrate segmental friction units 20 which have modified versions of the cut-off portion 31 set forth in the paragraph ③. Both of FIG. 14 and FIG. 15, similarly to the segmental friction unit 20 illustrated in FIG. 13, illustrate segmental friction units 20 which have a cut-off portion 31 at the intermediate portion of the facing end surface 30.

In FIG. 14, the cut-off portion 31 has such a configuration that a half circle is removed from the segmental friction unit 20. It is possible to thus cut off a half circle configuration instead of the triangle configuration. In this case as well, similarly to the segmental friction unit 20 set forth in the paragraph ③, the facing end surface 30 of the segmental friction units 20 is constituted by a cut-off portion 31 and a cut-free portion 32. The cut-off portion 31 is formed as a letter "C" shape substantially.

In FIG. 15, the cut-off portion 31 has such a configuration that a rectangle is removed from the segmental friction unit 20. It is possible to cut off a quadrangle configuration. In this case as well, similarly to the segmental friction unit 20 set forth in the paragraph ③, the facing end surface 30 of the segmental friction units 20 is constituted by a cut-off portion 31 and a cut-free portion 32. The cut-off portion 31 is formed as a letter "U" shape, which is turned in the counterclockwise or clockwise direction by 90 degrees, substantially.

The facing end surface 30 of both of these segmental friction units 20, illustrated in FIG. 14 and FIG. 15, is constituted, respectively, by a substantially letter "C" shape or a substantially letter "U" shape, which is turned in the counterclockwise or clockwise direction by 90 degrees, and end surfaces 32a, 32b which are positioned on the inner peripheral side and the outer peripheral side, respectively.

In this case as well, it is possible to set forth similarly to the paragraph ③. Namely, an "L" shall designate a width of the segmental friction unit 20, i.e., a length from the inner peripheral side to the outer peripheral side. Further, an "L4" and an "L5" shall designate the lengths of the cut-free portions 32a, 32b, respectively. Furthermore, an "L6" shall designate a radial distance of the cut-off portion 31. Moreover, a "D" shall designate a depth, to which the cut-off portion 31 is cut off inside the segmental friction unit 20. In addition, a "W" shall designate a length from the center line of the oil groove 10 to the cut-free portions 32a, 32b, i.e., the facing end surface 30 excluding the cut-off portion 31.

In this case, it is preferred that the "L4" can fall in a range of from 10 to 80% of "L", that the "L5" can fall in a range of from 10 to 80% of "L", and that the "L6" can fall in a range of from 5 to 30% of the "L", respectively. When the "L4" is less than 10% of the "L", the strength becomes insufficient on the inner peripheral side of the segmental friction unit 20. Further, when the "L5" is less than 10% of the "L", the strength becomes insufficient on the outer peripheral side of the segmental friction unit 20. When the "L6" exceeds 30% of "L", the oil resides in the cut-off portion 31 so much that the oil is supplied excessively onto the surface of the segmental friction unit 20, and that the oil film enlarges excessively on the surface of the segmental friction unit 20. As a result, the frictional force lowers when the resulting wet type friction member engages with a mating member. On the contrary, when the "L6" is less than 5% of "L", the oil is supplied insufficiently onto the surface of the segmental friction unit 20.

Further, the "D" can preferably be adjusted in a range of from 0.3 to 5.0 times, further preferably in a range of from 0.5 to 2.0 times, of the "W". When the "D" is less than 0.3 times of the "W", the oil is supplied insufficiently onto the surface of the segmental friction unit 20. When the "D" exceeds 5.0 times of the "W", the oil is supplied excessively onto the surface of the segmental friction unit 20 so that the oil film enlarges excessively on the surface of the segmental friction units 20. As a result, the frictional force lowers too much when the resulting wet type friction member engages with a mating member.

(Examination)

Figure 19:
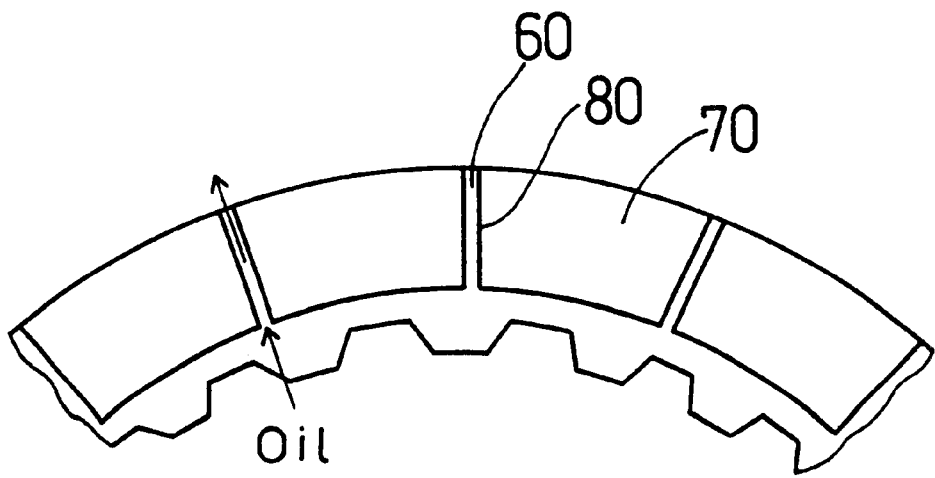
FIG. 19 is a drawing for illustrating a partial configuration of a conventional wet type friction member.

On the examples of the present wet type friction member 50, a heat resistance test and a dragging torque test were carried out. The examples subjected to the tests were Example No. 2 of the wet type friction member 50 illustrated in FIG. 3 and Example No. 5 of the wet type friction member 50 illustrated in FIG. 6. Further, for comparison, a wet type friction member, which had oil grooves of a constant groove width, illustrated in FIG. 19 was subjected to the tests as Comparative Example No. 1. Furthermore, a wet type friction member, which was free from the oil groove, was subjected to the tests as Comparative Example No. 2.

In all of the wet type friction members of Example No. 2, Example No. 5 and Comparative Example No. 1, twenty pieces of the segmental friction units were bonded in a ring-shaped manner on the core plate, and accordingly the oil grooves were formed. In all of these wet type friction members, a ring, which was formed by the segmental friction members, had an inside diameter of ø110 mm, and the ring had an outside diameter of ø130 mm. The wet type friction member of Comparative Example No. 2 was a wet type friction member, which had a core plate and one piece of friction unit bonded in a ring-shaped manner on the core plate. In this comparative wet type friction member as well, a ring, which was formed by the friction unit, had an inside diameter of ø110 mm, and the ring had an outside diameter of ø130 mm.

Figure 17:
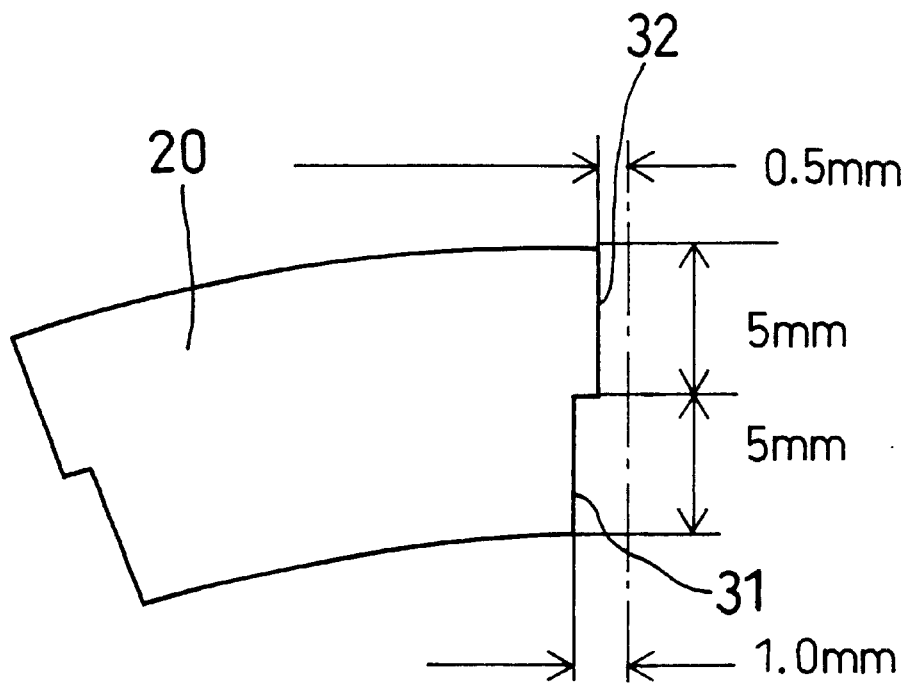
FIG. 17 is a drawing for illustrating a segmental friction unit, which is employed in Example No. 2.

The segmental friction units of Example No. 2 of the wet type friction member 50 had, as illustrated in FIG. 17, the cut-off portion 31, whose length was 5.0 mm, and the cut-free portion 32, whose length was 5.0 mm. Further, in the cut-off portion 31, the distance from the center of the oil groove to the cut-off portion 31 was 1.0 mm, and, in the cut-free portion 32, the distance from the center of the oil groove to the cut-free portion 32 was 0.5 mm.

Figure 18:
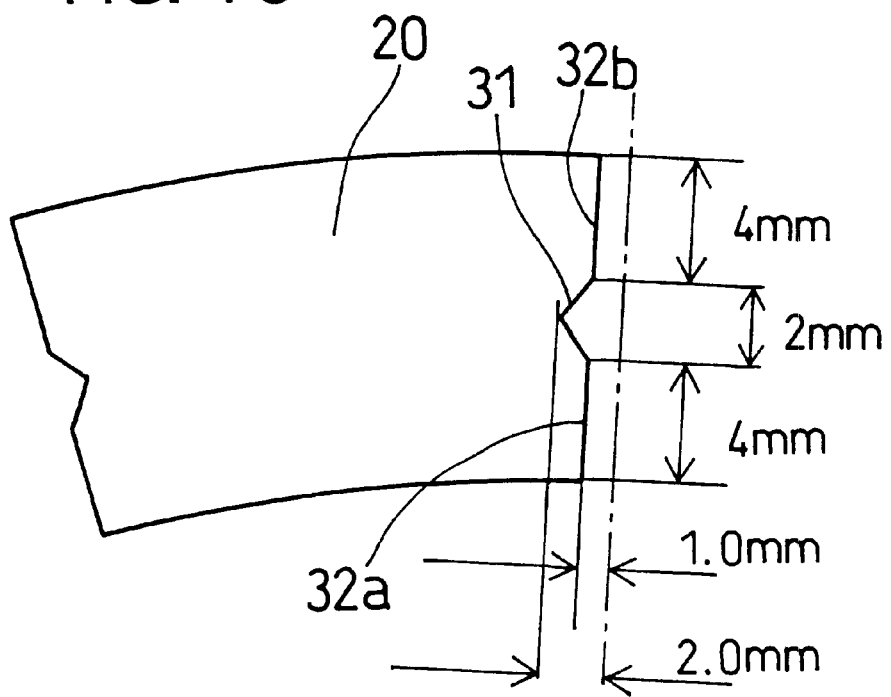
FIG. 18 is a drawing for illustrating a segmental friction unit, which is employed in Example No. 5.

The segmental friction units of Example No. 5 of the wet type friction member 50 had, as illustrated in FIG. 18, the inner peripheral side and outer peripheral side cut-free portions 32a, 32b, whose length was 4.0 mm in both of them, and the cut-off portion 31, whose radial length was 2.0 mm. Moreover, in the cut-free portions 32a, 32b, the distance from the center of the oil groove to the cut-free portions 32a, 32b was 1.0 mm, and the distance from the center of the oil groove to the leading end of the cut-off portion 31, which was cut inside the segmental friction units 20, was 2.0 mm. Namely, the cut-off depth of the cut-off portion itself was 1.0 mm.

Figure 20:
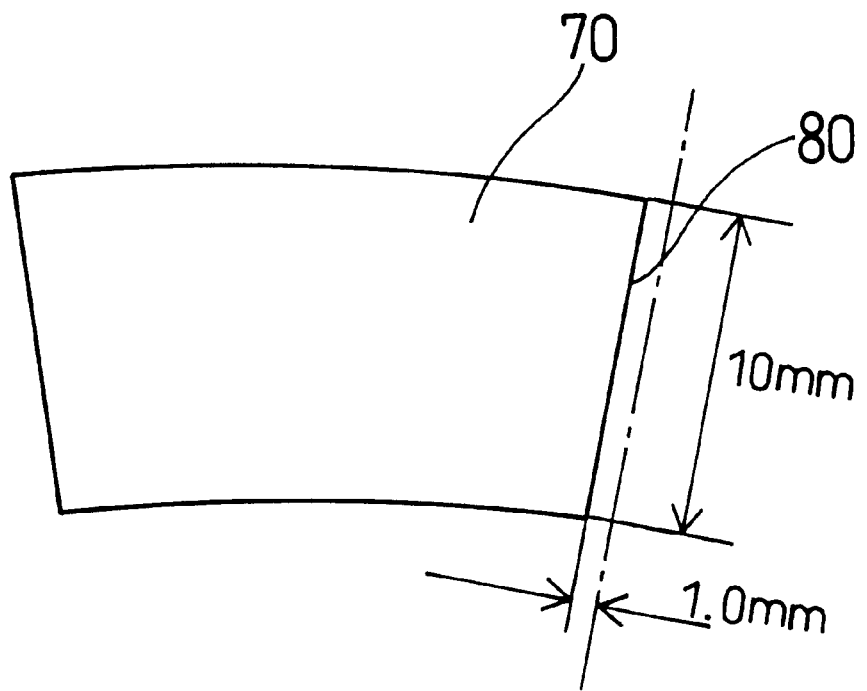
FIG. 20 is a drawing for illustrating a segmental friction unit, which is employed in Comparative Example No. 1.

The segmental friction units 70 of Comparative Example No. 1 had, as illustrated in FIG. 20, the facing end surface 80, whose radial length was 10 mm. The distance from the center of the oil groove 60 to the facing end surface 80 was 1.0 mm.

In the heat resistance test, the wet type friction members of Example No. 2, Comparative Example No. 1 and Comparative Example No. 2 were tested. In the dragging torque test, the wet type friction members of Example No. 2, Example No. 5, Comparative Example No. 1 and Comparative Example No. 2 were tested.

① Heat Resistant Test

Figure 16:
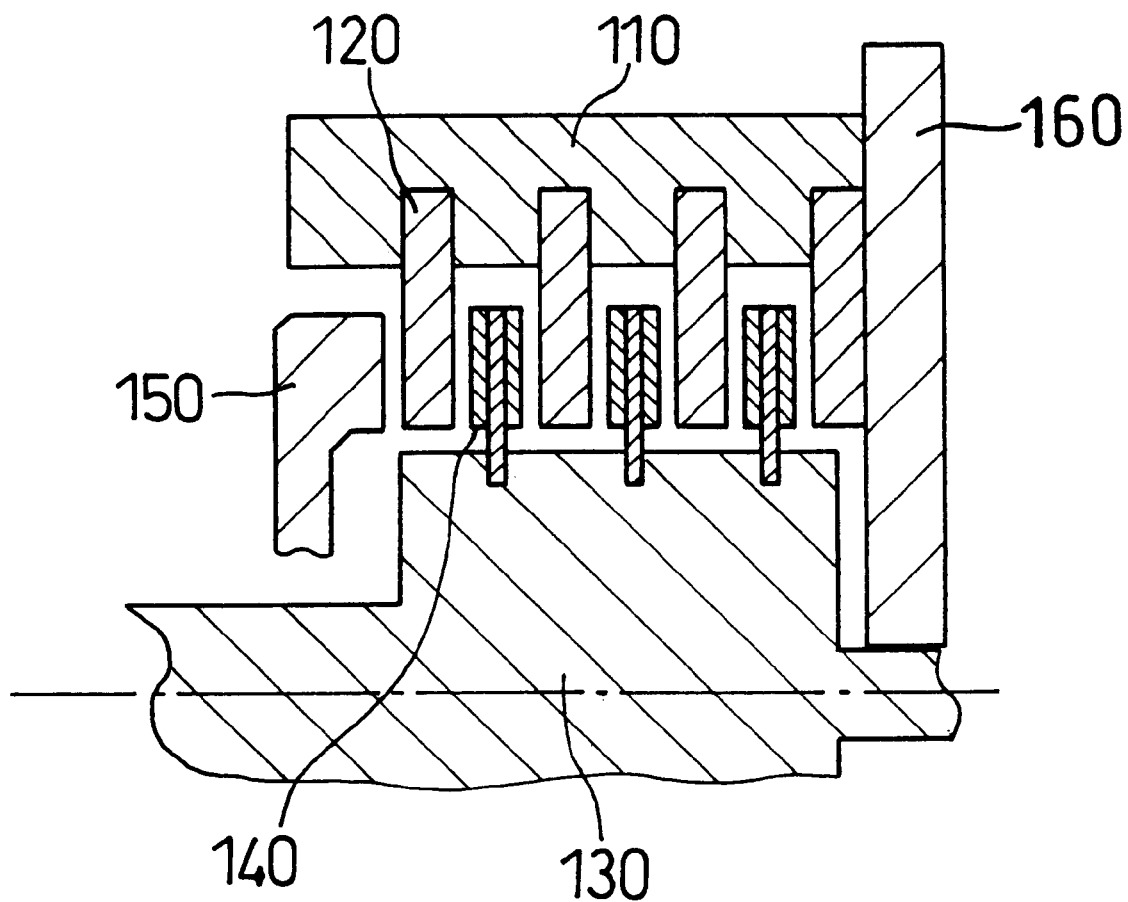
FIG. 16 is a drawing for illustrating an outline of a heat resistance test.

The outline of the heat resistance test is illustrated in FIG. 16. Four clutch plates 120 and a collar 110 meshed with each other by way of splines, which were formed on them, respectively, and three wet type friction members 140 and a hub 130 meshed with each other by way of splines, which were formed on them as well, respectively. Then, the four clutch plates 140 and the three wet type friction members 140 were put side by side alternately. Note that, since the wet type friction members 140 and the hub 130 meshed with each other by way of the splines, they were movable horizontally. Moreover, the clutch plates 120 and the collar 110 were similarly movable horizontally. However, a cover 160 inhibited the clutch plates 120 from moving in the right direction in FIG. 16. Under the circumstances, the hub 130 was rotated, and accordingly the wet type friction members 140 were rotated. At a stage in which the rotation reached to a predetermined number of revolutions (i.e., a number of engagement revolutions), the clutch plates 120 were pressed by a piston 150 so that the clutch plates 120 held and pressed the wet type friction members 140 from the opposite sides. Then, the time until the wet type friction members 140 stopped (i.e., a stoppage time) was measured. Thereafter, a number of engagement times, at which the stoppage time was extended by 10% compared with the initially measured stoppage time, were measured.

When the number of engagement times, until which the stoppage time was extended by 10%, were prolonged, it is possible to say that the resistance against the heat, resulting from the friction, was improved, and that the durability (i.e., the longevity) of the wet type friction members 140 was extended.

The engagement revolutions of the wet type friction members 140 were 4,500 rpm, and the inertial moment of the wet type friction members 140 was 0.25 kg·m². Namely, when the clutch plates 120 held and pressed the wet type friction members 140 at the engagement revolutions of 4,500 rpm, the wet type friction members 140 were rotated by inertia. The amount of a lubricating oil for lubricating the axial center was 200 c.c./min. Further, the temperature of the oil was 100° C. Furthermore, the pressure exerted by the clutch plates 140 was 1.0 MPa. Note that the wet type friction member 50 of Example No. 2 and the wet type friction members of Comparative Example No. 1 and Comparative No. 2 served as the wet type friction members 140, which were used in this test, respectively. The results of the test are set forth in Table 1 below.

TABLE 1

| Ex. No. 2 | 5,000 times |
| Comp. Ex. No. 1 | 3,500 times |
| Comp. Ex. No. 2 | 2,000 times |

From the aforementioned results, it was understood that it was necessary for the wet type friction member 50 of Example No. 2 to repeat the test for 5,000 times until the stoppage time of the wet type friction member 50 was extended by 10%. This result reveals that, compared with Comparative Example No. 1 and Comparative Example No. 2, the longevity of the wet type friction member 50 was extended remarkably.

② Dragging Torque Test

Figure 21:
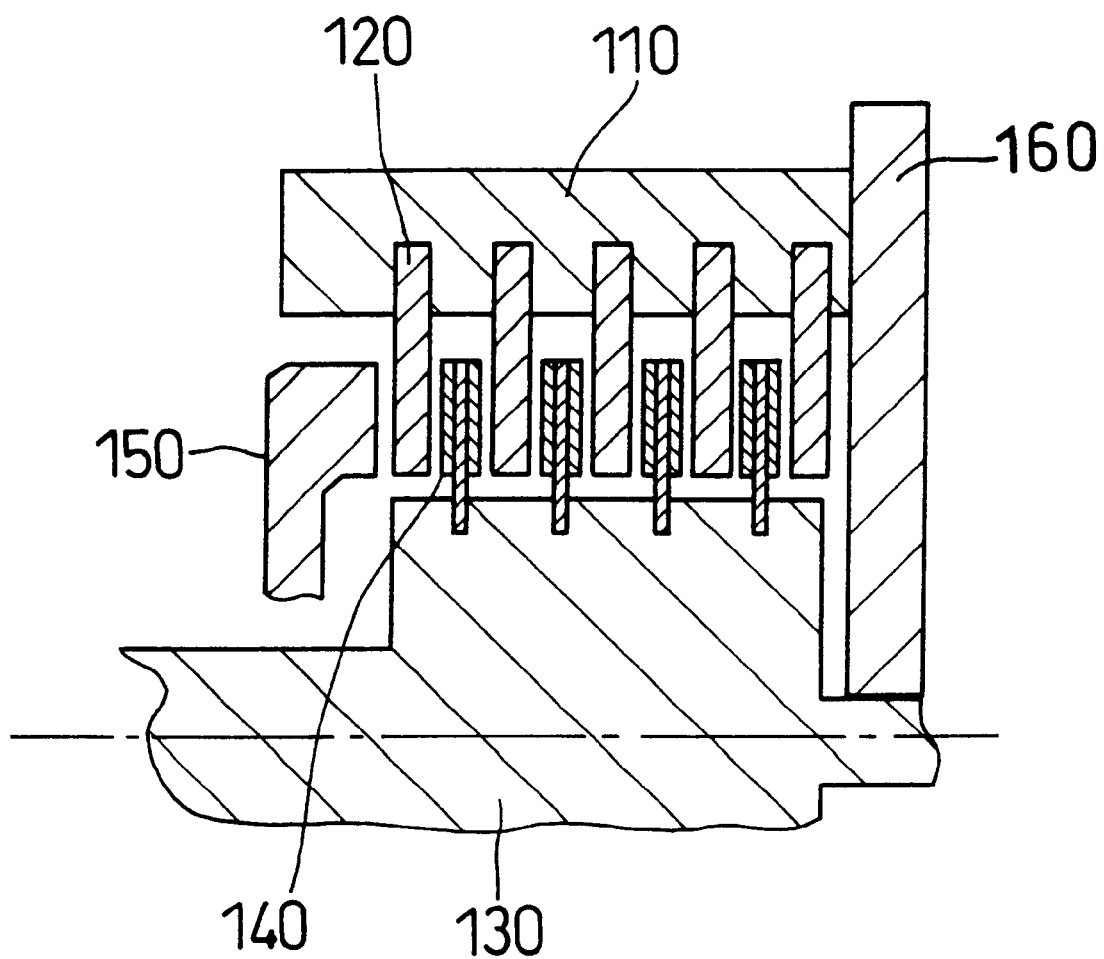
FIG. 21 is a drawing for illustrating an outline of a dragging torque test.

The outline of the dragging torque test is illustrated in FIG. 21. Five clutch plates 120 and a collar 110 meshed with each other by way of splines, which were formed on them, respectively, and four wet type friction members 140 and a hub 130 meshed with each other by way of splines, which were formed on them as well, respectively. Then, the five clutch plates 120 and the four wet type friction members 140 were put side by side alternately. Note that, since the wet type friction members 140 and the hub 130 meshed with each other by way of the splines, they were movable horizontally. Moreover, the clutch plates 120 and the collar 110 were similarly movable horizontally. However, a cover 160 inhibited the clutch plates 120 from moving in the right direction in FIG. 21.

Under the circumstances, the hub 130 was rotated, and accordingly the wet type friction members 140 were rotated. Then, the dragging torque was measured.

A number of revolutions of the wet type friction members 140 was adjusted to 1,000 rpm. Further, a piston 150 was placed at such a position that a difference, which was calculated by subtracting the thickness of the wet type friction members 140 from the intervals between the neighboring clutch plates 120, i.e., the pack clearance, was 0.1 mm on an average for every one of the wet type friction members 140. To put it differently, the piston 150 was placed at such a position that a difference, which was calculated by subtracting a sum of the thicknesses of the four wet type friction members 140 from a sum of four intervals between the neighboring clutch plates 120, was 0.4 mm. Thus, the pack clearance was adjusted to 0.1 mm on an average for every one of the wet type friction members 140. Furthermore, the amount of a lubricating oil for lubricating the axial center was 500 c.c./min., and the temperature of the oil was 80° C.

Note that, as set forth above, the wet type friction members 50 of Example No. 2 and Example No. 5 and the wet type friction members of Comparative Example No. 1 and Comparative No. 2 served as the wet type friction members 140, which were used in this test, respectively. The results of the test are set forth in Table 2 below.

TABLE 2

| | |
|---|---|
| Ex. No. 2 | 0.6N · m |
| Ex. No. 5 | 0.5N · m |
| Comp. Ex. No. 1 | 1.0N · m |
| Comp. Ex. No. 2 | 1.6N · m |

Compared with Comparative Example No. 1 and Comparative Example No. 2, Example No. 2 and Example No. 5 exhibited the reduced dragging torques. It is believed that the oil was supplied onto the surface of the segmental friction units 20, and that a force, which resulted from the flowing oil, was exerted to press the clutch plates 120 and the wet type friction members 50 of Example No. 2 and Example No. 5 off from each other.

Having now fully described the present invention, it will be apparent to one of ordinary skill in the art that many changes and modifications can be made thereto without departing from the spirit or scope of the present invention as set forth herein including the appended claims.

What is claimed is:

1. A wet type friction member, comprising:

a core plate;

a plurality of segmental friction units bonded to the core plate at intervals in a ring-shaped manner;

oil grooves demarcated and formed by facing end surfaces of two neighboring pieces of the segmental friction units, and connecting an inner peripheral side of the core plate to an outer peripheral side thereof;

the facing end surfaces of at least one of the segmental friction units having a cut-off portion, being cut off circumferentially, at an inner peripheral side end of the facing end surfaces, the cut-off portion includes a first end surface extending in a radial direction, and a second end surface extending in a direction toward an opposing one of the facing end surfaces; and all of the oil grooves being provided with a major-width portion of a wide groove width defined by the cut-off portion at an inner peripheral side opening of the oil grooves, a length from a center line of each of the oil grooves to the first end surface of the cut-off portions extending in the radial direction is from 1.3 to 5.0 times of a length from the center line of the oil grooves to the facing end surfaces excluding the cut-off portion.

2. A wet type friction member, comprising:

a core plate;

a plurality of segmental friction units bonded to the core plate at intervals in a ring-shaped manner;

oil grooves demarcated and formed by facing end surfaces of two neighboring pieces of the segmental friction units, and connecting an inner peripheral side of the core plate to an outer peripheral side thereof;

the facing end surfaces of at least one of the segmental friction units having a cut-off portion, being cut off circumferentially, at an inner peripheral side end of the facing end surfaces, the cut-off portion includes a first end surface extending in a radial direction, and a second end surface extending in a direction toward an opposing one of the facing end surfaces; and alternate ones of the oil grooves being provided with a major-width portion of a wide groove width defined by the cut-off portion at an inner peripheral side opening of the oil grooves, a length from a center line of each of the oil grooves to the first end surface of the cut-off portion extending in the radial direction is from 1.3 to 5.0 times of a length from the center line of each of the oil grooves to the facing end surfaces excluding the cut-off portion.

3. A wet type friction member, comprising:

a core plate;

a plurality of segmental friction units bonded to the core plate at intervals in a ring-shaped manner;

oil grooves demarcated and formed by facing end surfaces of two neighboring pieces of the segmental friction units, and connecting an inner peripheral side of the core plate to an outer peripheral side thereof;

the facing end surfaces of at least one of the segmental friction units having a cut-off portion, being cut off circumferentially, at an intermediate portion thereof; and all of the oil grooves being provided with a major-width portion of a wide groove width defined by the cut-off portion at an intermediate portion of the oil grooves, a radial length of the cut-off portion is from 5.0 to 30% of a radial length of one of the segmental friction units when the radial length of one of the segmental friction units is taken as 100%.

4. A wet type friction member, comprising:

a core plate;

a plurality of segmental friction units bonded to the core plate at intervals in a ring-shaped manner;

oil grooves demarcated and formed by facing end surfaces of two neighboring pieces of the segmental friction units, and connecting an inner peripheral side of the core plate to an outer peripheral side thereof;

the facing end surfaces at a trailing side relative to a rotational direction of at least one of the segmental friction units having a cut-off portion, being cut off circumferentially, at an inner peripheral side end of the facing end surfaces, the cut-off portion includes a first end surface extending in a radial direction, and a second end surface extending in a direction toward an opposing one of the facing end surfaces; and all of the oil grooves being provided with a major-width portion of a wide groove width defined by the cut-off portion at an inner peripheral side opening of the oil grooves, a length from a center line of each of the oil grooves to the first end surface of the cut-off portion extending in the radial direction is from 1.3 to 5.0 times of a length from the center line of each of the oil grooves to the facing end surfaces excluding the cut-off portion.

5. A wet type friction member, comprising:

a core plate;

a plurality of segmental friction units bonded to the core plate at intervals in a ring-shaped manner;

oil grooves demarcated and formed by facing end surfaces of two neighboring pieces of the segmental friction units, and connecting an inner peripheral side of the core plate to an outer peripheral side thereof;

the facing end surfaces at a trailing side relative to a rotational direction of at least one of the segmental friction units having a cut-off portion, being cut off circumferentially, at an inner peripheral side end of the facing end surfaces, the cut-off portion includes a first end surface extending in a radial direction, and a second end surface extending in a direction toward an opposing one of the facing end surfaces; and alternate ones of the oil grooves being provided with a major-width portion of a wide groove width defined by the cut-off portion at an inner peripheral side opening of the oil grooves, a length from a center line of each of the oil grooves to the first end surface of the cut-off portion extending in the radial direction is from 1.3 to 5.0 times of a length from the center line of each of the oil grooves to the facing end surfaces excluding the cut-off portion.

6. A wet type friction member, comprising:

a core plate;

a plurality of segmental friction units bonded to the core plate at intervals in a ring-shaped manner;

oil grooves demarcated and formed by facing end surfaces of two neighboring pieces of the segmental friction units, and connecting an inner peripheral side of the core plate to an outer peripheral side thereof;

the facing end surfaces of the two neighboring pieces of the segmental friction units having a cut-off portion, being cut off circumferentially, at an inner peripheral side end of the facing end surfaces, the cut-off portion includes a first end surface extending in a radial direction, and a second end surface extending in a direction toward an opposing one of the facing end surfaces, opposing facing end surfaces being symmetrical relative to a center line of each of the oil grooves; and all of the oil grooves being provided with a major-width portion of a wide groove width defined by the cut-off portion at an inner peripheral side opening of the oil grooves, a length from the center line of each of the oil grooves to the first end surface of the cut-off portion extending in a radial direction is from 1.3 to 5.0 times of a length from the center line of the each of the oil grooves to the facing end surfaces excluding the cut-off portion.

7. A wet type friction member, comprising:

a core plate;

a plurality of segmental friction units bonded to the core plate at intervals in a ring-shaped manner;

oil grooves demarcated and formed by facing end surfaces of two neighboring pieces of the segmental friction units, and connecting an inner peripheral side of the core plate to an outer peripheral side thereof;

the facing end surfaces of at least one of the segmental friction units having a cut-off portion, being cut off circumferentially, at an intermediate portion thereof; and alternate ones of the oil grooves being provided with a major-width portion of a wide groove width defined by the cut-off portion at an intermediate portion of the oil grooves, a radial length of the cut-off portion is from 5.0 to 30% of a radial length of one of the segmental friction units when the radial length of one of the segmental friction units is taken as 100%.

8. A wet type friction member, comprising:

a core plate;

a plurality of segmental friction units bonded to the core plate at intervals in a ring-shaped manner;

oil grooves demarcated and formed by facing end surfaces of two neighboring pieces of the segmental friction units, and connecting an inner peripheral side of the core plate to an outer peripheral side thereof;

the facing end surfaces at a trailing side relative to a rotational direction of at least one of the segmental friction units having a cut-off portion, being cut off circumferentially, at an intermediate portion thereof; and all of the oil grooves being provided with a major-width portion of a wide groove width defined by the cut-off portion at an intermediate portion of the oil grooves, a radial length from the cut-off portion is from 5.0 to 30% of a radial length of one of the segmental friction units when the radial length of one of the segmental friction units is taken as 100%.

9. A wet type friction member, comprising:

a core plate;

a plurality of segmental friction units bonded to the core plate at intervals in a ring-shaped manner;

oil grooves demarcated and formed by facing end surfaces of two neighboring pieces of the segmental friction units, and connecting an inner peripheral side of the core plate to an outer peripheral side thereof;

the facing end surfaces at a trailing side relative to a rotational direction of at least one of the segmental friction units having a cut-off portion, being cut off circumferentially, at an intermediate portion thereof; and alternate ones of the oil grooves being provided with a major-width portion of a wide groove width defined by the cut-off portion at an intermediate portion of the oil grooves, a radial length of the cut-off portion is from 5.0 to 30 of a radial length of one of the segmental friction units when the radial length of one of the segmental friction units is taken as 100%.

10. A wet type friction member, comprising:

a core plate;

a plurality of segmental friction units bonded to the core plate at intervals in a ring-shaped manner;

oil grooves demarcated and formed by facing end surfaces of two neighboring pieces of the segmental friction units, and connecting an inner peripheral side of the core plate to an outer peripheral side thereof;

the facing end surfaces of the two neighboring pieces at least one of the segmental friction units having a cut-off portion, being cut off circumferentially, at an interme diate portion thereof; opposing ones of the facing end surfaces being symmetrical relative to a center line of the oil grooves; and all of the oil grooves being provided with a major-width portion of a wide groove width defined by the cut-off portion at an intermediate portion of the oil grooves, a radial length of the cut-off portion is from 5.0 to 30% of a radial length of one of the segmental friction units when the radial length of one of the segmental friction units is taken as 100%.

* * * * *